US012720539B2

(12) United States Patent
Elhoushy et al.

(10) Patent No.: US 12,720,539 B2
(45) Date of Patent: Aug. 25, 2026

(54) METHODS, ARCHITECTURES, APPARATUSES AND SYSTEMS FOR LOGICAL CHANNEL PRIORITIZATION ENHANCEMENTS FOR NETWORK CODING

(71) Applicant: InterDigital Patent Holdings, Inc., Wilmington, DE (US)

(72) Inventors: Salah Elhoushy, LaSalle (CA); Ayesha Ijaz, Guildford (GB); Justin Cray, Philadelphia, PA (US); Faris Alfarhan, Montreal (CA); Pascal Adjakple, Great Neck, NY (US); Ghyslain Pelletier, Montreal (CA); Martino Freda, Laval (CA); Paul Marinier, Brossard (CA); Benoit Pelletier, Roxboro (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 296 days.

(21) Appl. No.: 18/641,689

(22) Filed: Apr. 22, 2024

(65) Prior Publication Data

US 2025/0330963 A1 Oct. 23, 2025

(51) Int. Cl.
*H04L 1/00* (2006.01)
*H04L 1/08* (2006.01)
(Continued)

(52) U.S. Cl.
CPC ....... *H04W 72/1268* (2013.01); *H04L 1/0076* (2013.01); *H04L 1/08* (2013.01);
(Continued)

(58) Field of Classification Search
CPC ....... H04L 1/0001–1896; H04L 5/0001–0098; H04W 28/02–26; H04W 72/02–569;
(Continued)

(56) References Cited

U.S. PATENT DOCUMENTS

2023/0198671 A1* 6/2023 Lagrange .............. H04L 1/0076
2023/0354352 A1 11/2023 Pelletier et al.

FOREIGN PATENT DOCUMENTS

WO 2023154845 A1 8/2023

OTHER PUBLICATIONS

"3rd Generation Partnership Project; Technical Specification Group Radio Access Network; NR; Medium Access Control (MAC) protocol specification (Release 17)", 3GPP TS 38.321, V17.2.0, Sep. 2022, 246 pages.

(Continued)

*Primary Examiner* — Timothy J Weidner
(74) *Attorney, Agent, or Firm* — Volpe Koenig

(57) ABSTRACT

Procedures, methods, architectures, apparatuses, systems, devices, and computer program products for logical channel prioritization, LCP, enhancements for packet data convergence protocol, PDCP, network coding, NC, are disclosed enhancements to LCP procedure, to account for requirements accompanying the introduction of NC in a protocol layer above LCP, e.g. PDCP, enabling a receiver, for example, to receive at least X linearly-independent NC PDUs to recover the X NC SDUs, to meet common delay budget requirements of NC PDUs belonging to a same NC generation, and to support differentiated handling of NC PDUs with different characteristics.

14 Claims, 12 Drawing Sheets

(51) Int. Cl.

| | |
|---|---|
| ***H04W 28/02*** | (2009.01) |
| ***H04W 28/04*** | (2009.01) |
| ***H04W 72/02*** | (2009.01) |
| ***H04W 72/1268*** | (2023.01) |
| ***H04W 72/23*** | (2023.01) |
| ***H04W 72/566*** | (2023.01) |
| ***H04W 84/02*** | (2009.01) |
| ***H04W 88/02*** | (2009.01) |
| ***H04W 88/08*** | (2009.01) |
| ***H04W 92/02*** | (2009.01) |
| ***H04W 92/10*** | (2009.01) |

(52) U.S. Cl.
CPC ....... *H04W 28/0205* (2013.01); *H04W 28/04* (2013.01); *H04W 72/02* (2013.01); *H04W 72/23* (2023.01); *H04W 72/566* (2023.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ..... H04W 76/10–50; H04W 84/02–16; H04W 88/02–12; H04W 92/02–04; H04W 92/10
See application file for complete search history.

(56) References Cited

OTHER PUBLICATIONS

Nokia, “Report on LTE legacy, XR, QoE and MUSIM”, 3GPP Tdoc R2-2301902, 3GPP TSG-RAN WG2 Meeting #121, Athens, Greece, Feb.-Mar. 2022, 47 pages.
Lenovo, “XR-specific Capacity Enhancement Techniques,” 3GPP TSG RAN WG1 #109-e, R1-2204415, e-Meeting (May 9-20, 2022).

* cited by examiner

IP Packets
QoS Flows
SDAP
QoS flow handling
Radio Bearers
PDCP
Comp.
Comp.
Security
Security
Network Coding
Network Coding
RLC Channels
RLC
Segm. ARQ
...
Segm. ARQ
Logical Channels
MAC
Scheduling
Multiplexing
HARQ
Transport Channels
Transport Block(s)

Receiving configuration information related to multiple logical channels (LCHs) associated with an packet data convergence protocol (PDCP) network coding (NC) process, the multiple LCHs carrying correlated NC packet data units (PDUs) having different characteristics — 901

Selecting an LCH from the LCHs carrying correlated NC PDUs for uplink (UL) transmission over an UL grant based on the characteristics of the NC PDUs carried in the LCHs and based on configuration of the UL grant — 902

Allocating UL resources to NC PDUs from the selected LCH and transmitting the NC PDUs from the selected LCH using the allocated UL resources — 903

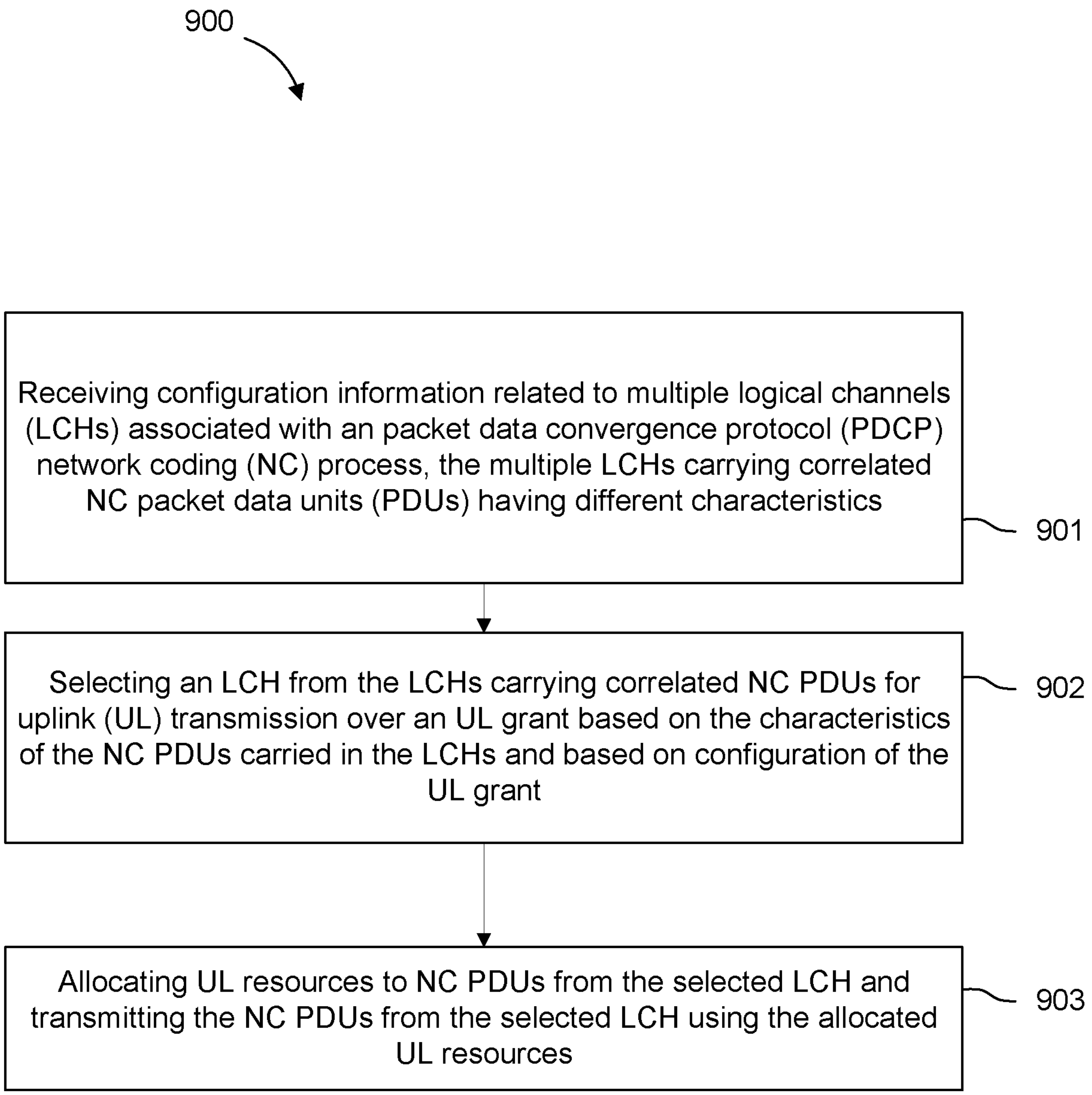

FIG. 9

METHODS, ARCHITECTURES, APPARATUSES AND SYSTEMS FOR LOGICAL CHANNEL PRIORITIZATION ENHANCEMENTS FOR NETWORK CODING

INCORPORATION BY REFERENCE

The following documents are incorporated by reference in their entirety: 3GPP R2-2301902, "Report on LTE legacy, XR, QoE and MUSIM", RAN2 #121, vice chairman (Nokia), and TS 3GPP TS 38.321 v17.2.0, 2022/10.

BACKGROUND

The present disclosure is generally directed to the fields of communications, software and encoding, including, for example, to methods, architectures, apparatuses, systems related to logical channel prioritization enhancements for network coding.

SUMMARY

There are disclosed embodiments of methods, as described in the following and as claimed in the appended claims.

There are disclosed embodiments of a device, as described in the following and as claimed in the appended claims.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures (FIGS.) and the detailed description are not to be considered limiting, and other equally effective examples are possible and likely. Furthermore, like reference numerals ("ref.") in the FIGS. indicate like elements, and wherein:

FIG. 9 is a flow chart of a method 900 according to an embodiment.

DETAILED DESCRIPTION

Abbreviations and Acronyms

Figure 1A:
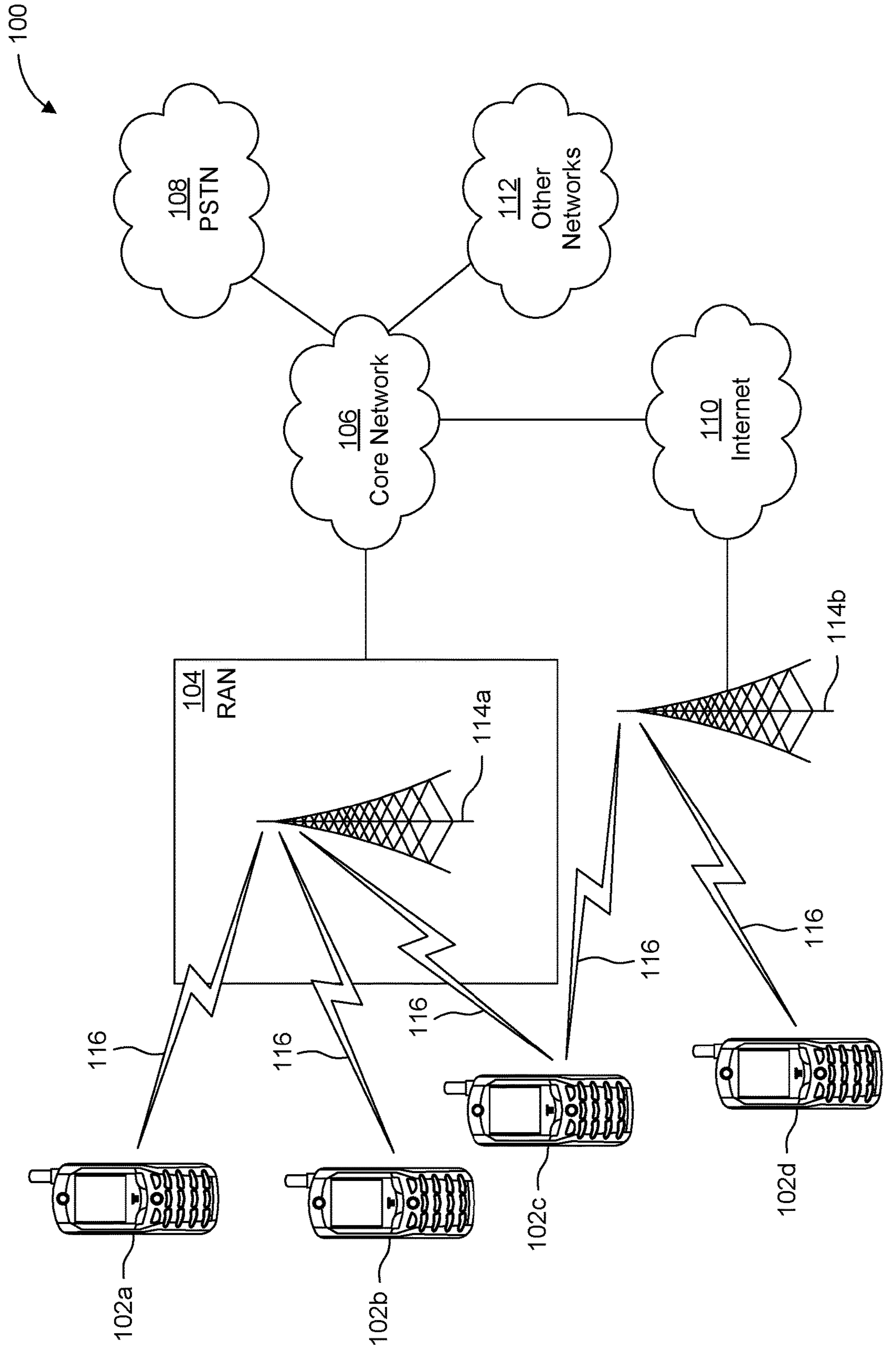
FIG. 1A is a system diagram illustrating an example communications system.

| | |
|---|---|
| ACK | Acknowledgement |
| AM | Acknowledgement mode |
| BWP | Bandwidth part |
| BS | Base Station (Network Node) |
| CA | Carrier aggregation |
| DC | Dual connectivity |
| DRB | Data radio bearer |
| DSR | Delay status report |
| eMBB | Enhanced mobile broadband |
| HARQ | Hybrid automatic repeat request |
| LCH | Logical channel |
| LCP | Logical channel prioritization |
| MAC | Medium access control |
| MCS | Modulation and coding scheme |
| MIMO | Multiple-input multiple-output |
| Nack | Non-acknowledgement |
| NC | Network coding |
| NR | New radio |
| NW | Network |
| PBR | Prioritized bit rate |
| PDCCH | Physical downlink control channel |
| PDCP | Packet data convergence protocol |
| PDU | Protocol data unit |
| PHY | Physical layer |
| PUSCH | Physical uplink shared channel |
| PSDB | PDU set delay budget |
| PSI | PDU set importance |
| PSIHI | PDU set integrated handling indication |
| QoS | Quality of service |
| RLC | Radio link control |
| RSRP | Reference signal received power |
| RSRQ | reference signal received quality |
| RX | Receive/Reception |
| SCS | Subcarrier spacing |
| SDAP | Service Data Adaptation Protocol |
| SDU | Service data unit |
| SINR | signal-to-noise and interference ratio |
| TB | Transport block |
| TX | Transmit/Transmission |
| UE | User equipment |
| UL | Uplink |
| URLLC | Ultra-reliable and low latency communications |
| XR | Extended reality |

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

A symbol "/" (e.g., forward slash) may be used herein to represent "and/or", where for example, "A/B" may imply "A and/or B".

Example Communications System

The methods, apparatuses and systems provided herein are well-suited for communications involving both wired and wireless networks. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

FIG. 1A is a system diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a “station” and/or a “STA”, may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d*, e.g., to facilitate access to one or more communication networks, such as the CN 106/115, the Internet 110, and/or the networks 112. By way of example, the base stations 114*a*, 114*b* may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in an embodiment, the base station 114*a* may include three transceivers, i.e., one for each sector of the cell. In an embodiment, the base station 114*a* may employ multiple-input multiple output (MIMO) technology and may utilize multiple transceivers for each or any sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In an embodiment, the base station 114*a* and the WTRUs 102*a*, 102*b*, 102*c* may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In an embodiment, the base station 114*b* and the WTRUs 102*c*, 102*d* may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VOIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/114 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
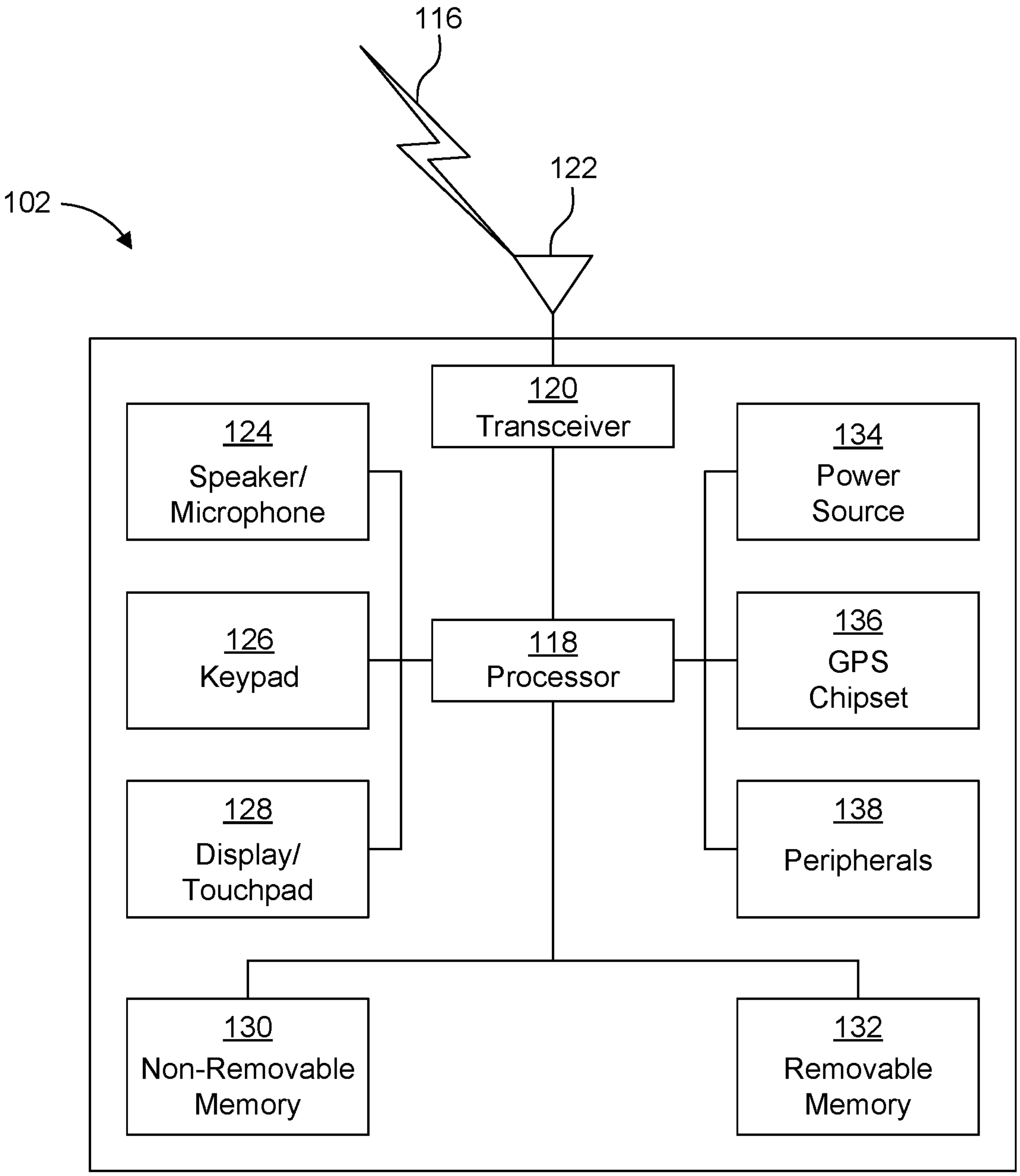
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other elements/peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114*a*) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. For example, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements/peripherals 138, which may include one or more software and/or hardware modules/units that provide additional features, functionality and/or wired or wireless connectivity. For example, the elements/peripherals 138 may include an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The elements/peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
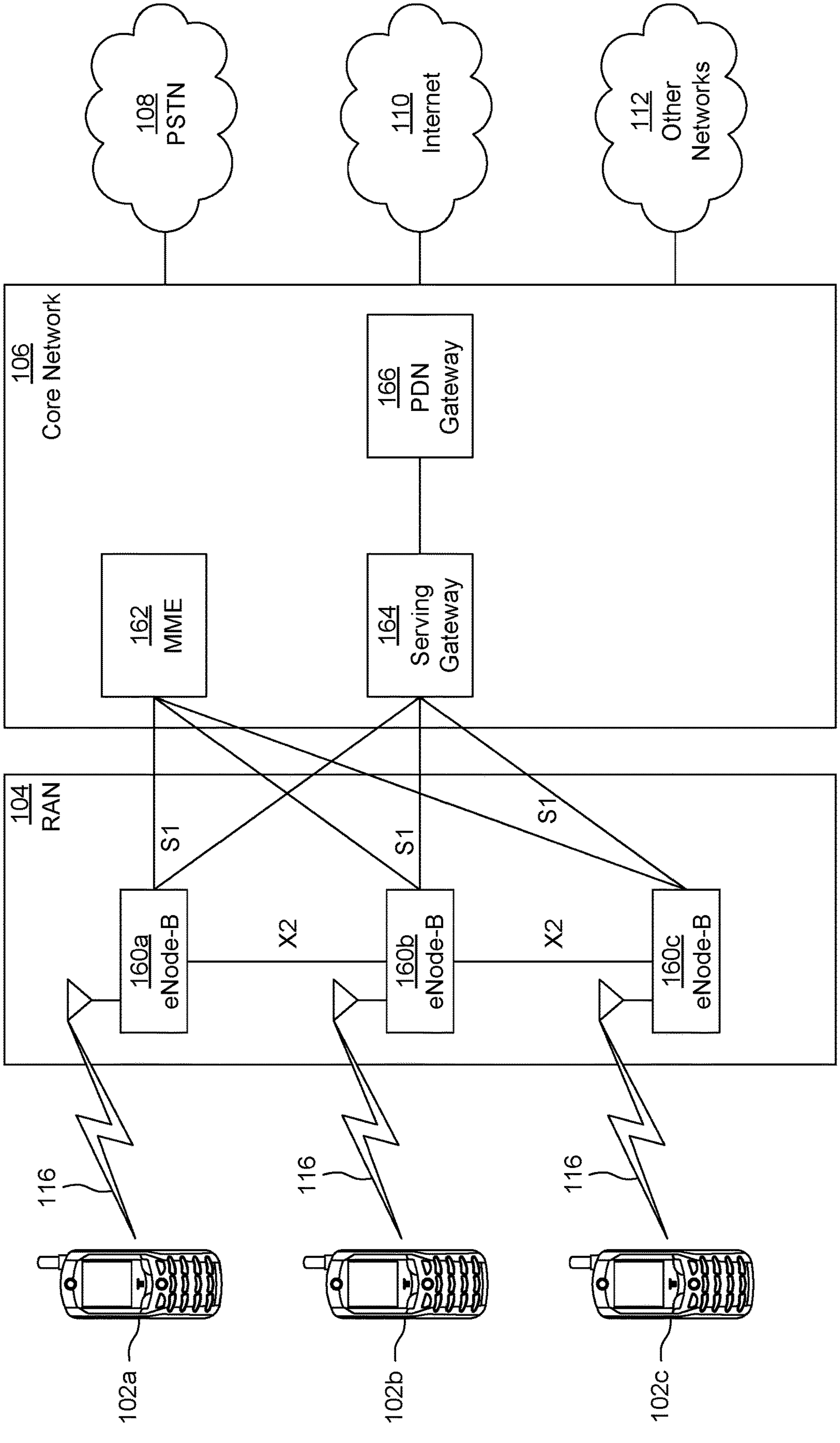
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, and 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In an embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink (UL) and/or downlink (DL), and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While each of the foregoing elements are depicted as part of the CN 106, it will be appreciated that any one of these elements may be owned and/or operated by an entity other than the CN operator.

The MME 162 may be connected to each of the eNode-Bs 160*a*, 160*b*, and 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode-Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode-B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure basic service set (BSS) mode may have an access point (AP) for the BSS and one or more stations (STAs) associated with the AP. The AP may have an access or an interface to a distribution system (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an “ad-hoc” mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier sense multiple access with collision avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High throughput (HT) STAs may use a 40 MHz wide channel for communication, for example, via a combination of the primary 20 MHz channel with an adjacent or nonadjacent 20 MHz channel to form a 40 MHz wide channel.

Very high throughput (VHT) STAs may support 20 MHz, 40 MHZ, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse fast fourier transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to a medium access control (MAC) layer, entity, etc.

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV white space (TVWS) spectrum, and 802.11ah supports 1 MHz, 2 MHz, 4 MHZ, 8 MHZ, and 16 MHz bandwidths using non-TVWS spectrum. According to a representative embodiment, 802.11ah may support meter type control/machine-type communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or network allocation vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
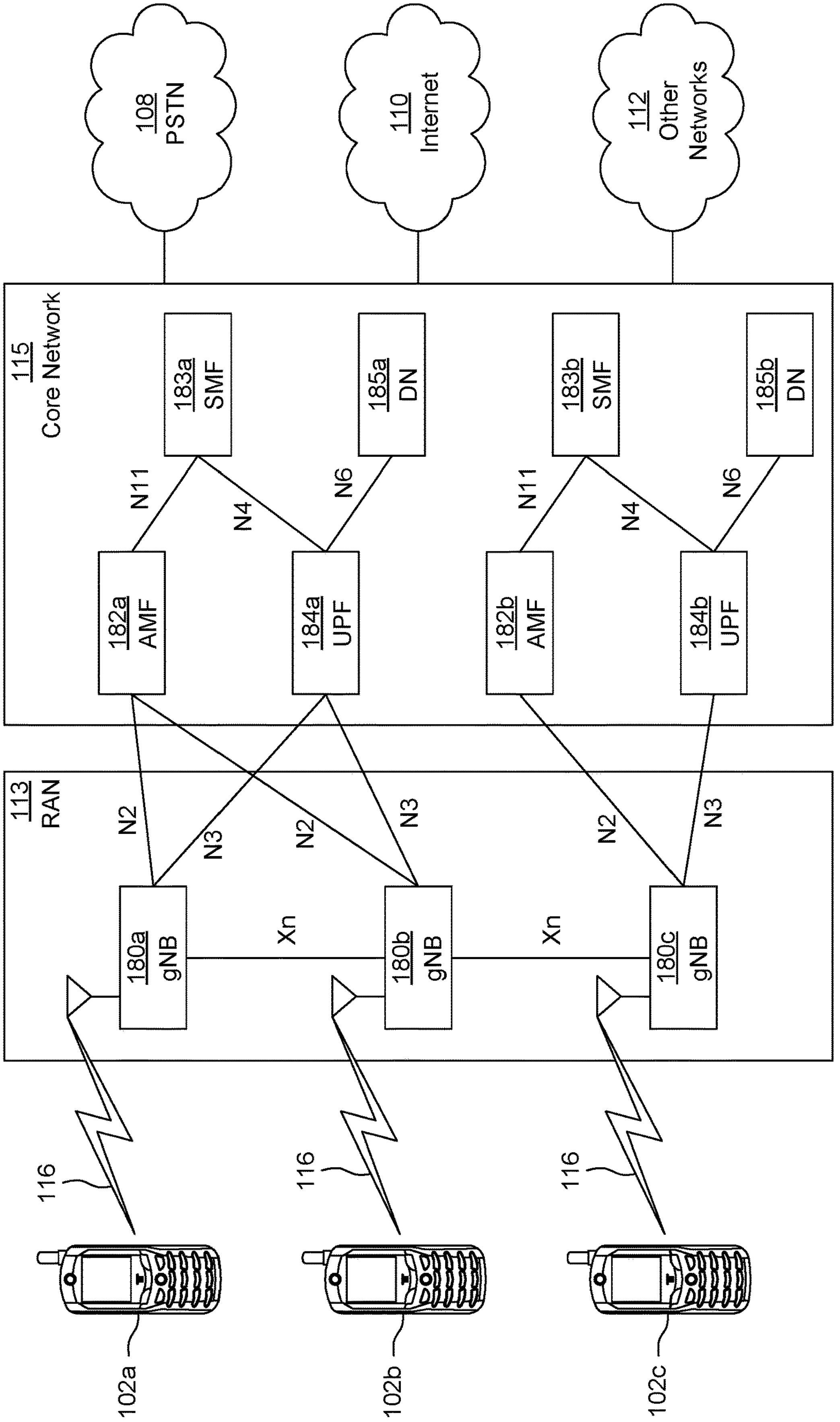
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In an embodiment, the gNBs 180*a*, 180*b*, 180*c* may implement MIMO technology. For example, gNBs 180*a*, 180*b* may utilize beamforming to transmit signals to and/or receive signals from the WTRUs 102*a*, 102*b*, 102*c*. Thus, the gNB

180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., including a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANS (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards user plane functions (UPFs) 184*a*, 184*b*, routing of control plane information towards access and mobility management functions (AMFs) 182*a*, 182*b*, and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one session management function (SMF) 183*a*, 183*b*, and at least one Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of NAS signaling, mobility management, and the like. Network slicing may be used by the AMF 182*a*, 182*b*, e.g., to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, e.g., to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In an embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to any of: WTRUs 102*a-d*, base stations 114*a-b*, eNode-Bs 160*a-c*, MME 162, SGW 164, PGW 166, gNBs 180*a-c*, AMFs 182*a-b*, UPFs 184*a-b*, SMFs 183*a-b*, DNs 185*a-b*, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Network coding is a packet processing function that transforms X input packet(s) into Y output packet(s). In general X is greater or equal to 2 and Y is greater or equal to X, with the case X equal to 1 and Y equal to 1 being a special case. The X input packets being coded together form a network coding generation (denoted hereinafter a generation). An input packet may be an SDU or a segment of an SDU (NC SDU or NC SDU-segment (e.g., PDCP SDU or PDCP SDU-segment)). An output packet is denoted NC PDU (e.g., PDCP PDU). Network coding is therefore a packet processing function that transforms X NC SDU(s) into Y NC PDUs. The NC PDUs associated with the same generation may be of same or different characteristics, and therefore associated with same or different importance/priority levels. Such characteristics may be systematic packets, coded packets, less-innovative coded packets, more-innovative coded packets, etc. (see further on in this document about the use of the term "innovative" in this context). Furthermore, there may be dependencies between NC PDUs of the same generation in the sense that: a) the receiver needs to receive X linearly-independent NC PDUs or more to recover the X NC SDUs; b) how many more NC PDUs or specific NC PDUs are needed by the receiver to recover the X NC SDUs depends on the NC PDUs already available at the receiver; c) the scheduling of the NC PDUs of the same generation is constrained by the same overall delay budget.

Figure 2:
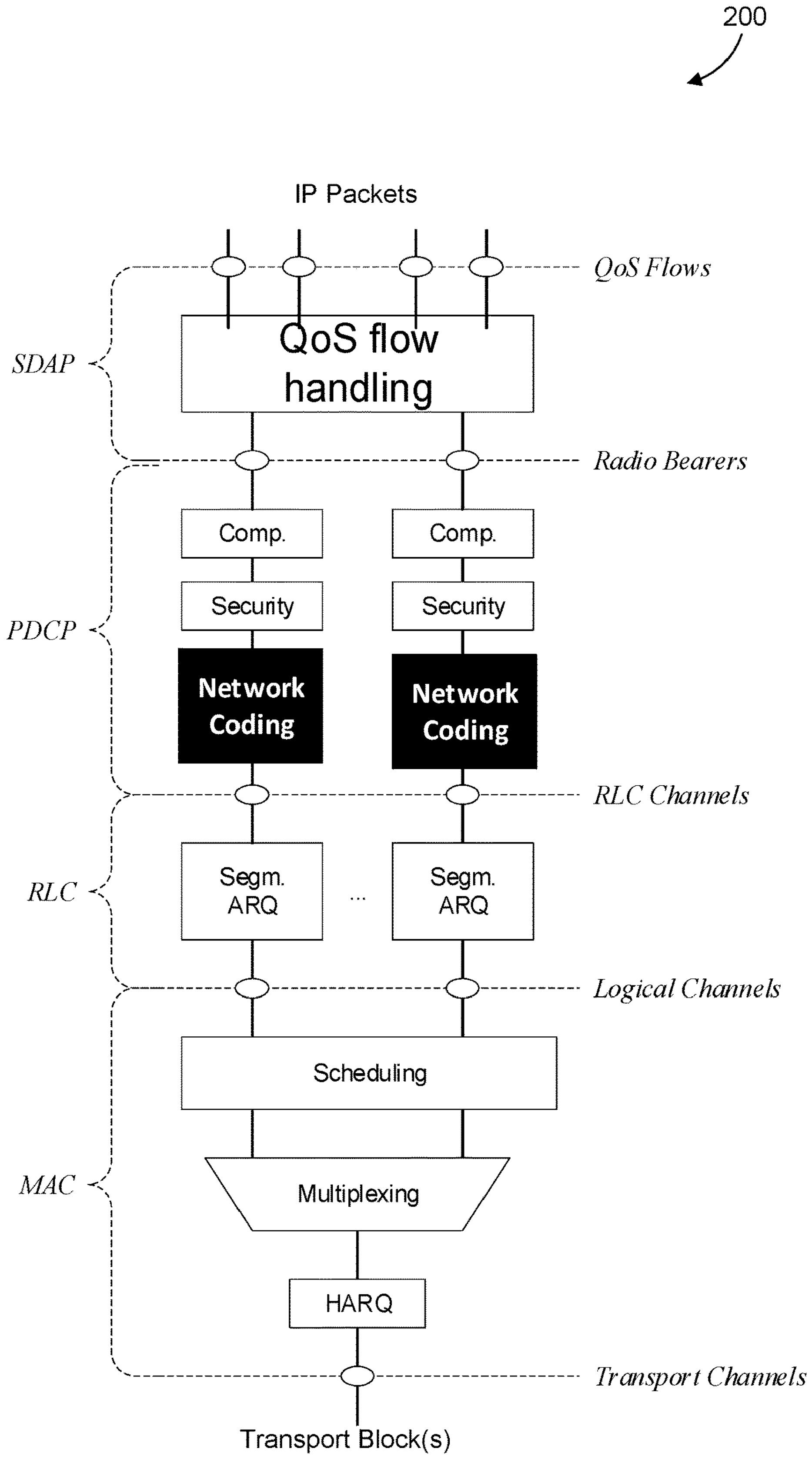
FIG. 2 is an Example Uplink Layer 2 Structure with NC protocol in PDCP.

Based on the above, the concept of PDU set introduced in 3GPP R18 and specification enhancements/discussions may be leveraged, with the difference that the NC PDU here are PDUs generated by the protocol layer that implements the NC function e.g. as shown in FIG. 2, and not PDUs of layers above the access stratum (e.g., application layer). For example, PDU set related information such as PDU Set Importance (PSI), PDU Set Integrated Handling Indication (PSIHI), PDU Set Delay Budget (PSDB) may be introduced in relation with NC PDUs generated by network coding. The same generation may include more than one dependent NC PDU sets where each NC PDU set has NC PDUs that share similar characteristics. The receiver may need to receive some/all dependent NC PDU sets to recover the source packets. Such requirements of different NC PDU sets for source packet recovery is denoted hereinafter as dependent NC PDU set integrated handling.

Figure 3:
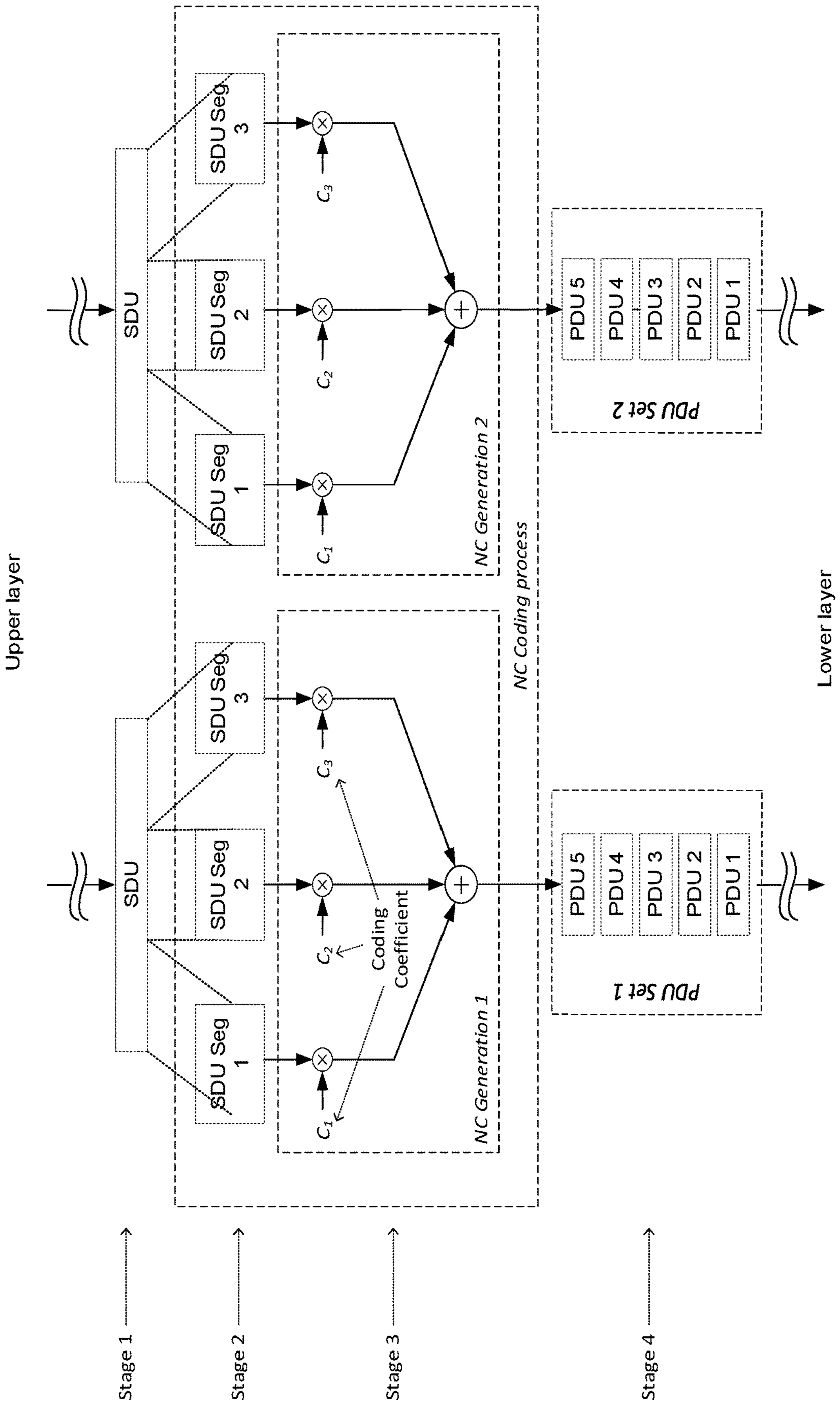
FIG. 3 is Segmented-SDU based NC.
Figure 4:
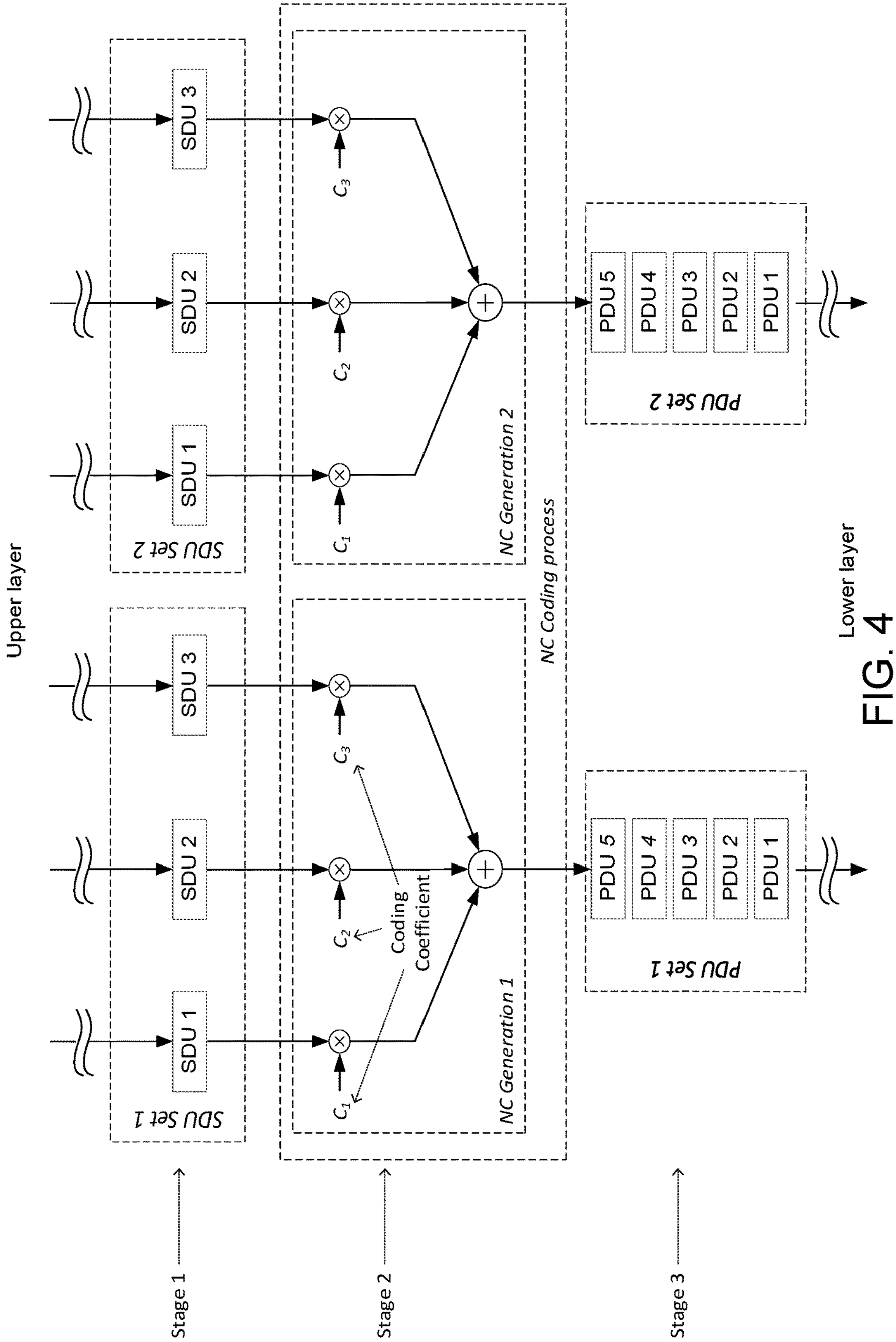
FIG. 4 is Cross-SDU based NC.

The NC encoding process can support one or multiple NC generations in parallel as shown in FIG. 3 and FIG. 4. FIG. 3 shows segmented-SDU based NC in which one NC SDU is segmented and NC is performed on the segments (i.e. one-to-many mapping). FIG. 4 shows cross-SDU based NC in which NC is performed using multiple SDUs per NC generation (i.e. many-to-many mapping). Given that NC PDUs/PDU sets from same generation may have different characteristics, methods to handle these NC PDUs differently may be required to maximize the performance benefit of network coding. For instance, NC PDUs/PDU sets with different characteristics from the same NC generation may be mapped to different RLC entities/LCHs as a function of one or more of their characteristics. The different LCHs to which the different NC PDUs/PDU sets are mapped can either belong to the same MAC entity (referred to as CA network coding) or to different MAC entities (referred to as DC network coding). CA network coding can also be configured in either or both of the MAC entities together with DC network coding when network coding over more than two RLC entities is configured for a radio bearer. Furthermore, NC PDUs/PDU sets with different characteristics from the same NC generation may be mapped to same RLC entity. In this case, NC PDUs/PDU sets with different characteristics can be handled differently using one or more of MAC layer processing (e.g., UL scheduling), PHY resources (time, space, frequency), and transmission methods (e.g., waveform, MIMO/beamforming technique, etc.).

In Release 18 (R18), RAN2 has decided not to support delay-aware LCP and not to introduce changes to LCP due to PDU prioritization. This decision was made in the context of enhancements for XR. However, the use cases being considered for NC include URLLC or a combination of URLLC and eMBB meaning URLLC at high data rates. The R18 decision not to enhance LCP may lead to a level of packet error rate which is not appropriate for the reliability requirements of NC use cases. Because of that, further enhancements to LCP in the case of NC PDU set handling may be required.

For PDCP duplication, LCP procedure has not been enhanced. However, while NC in PDCP can be considered as an extension to PDCP duplication, there is a difference in the sense that in PDCP duplication, the receiver only needs to receive one copy of the packet since the duplicated packets are identical. Differently, in NC, a decision about which coded packets to transmit for a timely recovery of the source packets at the receiver need to be made since the NC packets are not identical/equally-generated, but have different characteristics. Such decision might justify further enhancements to LCP procedure in case of NC.

In support of RLC AM, the prior-art LCP procedure is not explicitly delay-aware. However, it contains rules to minimize segmentation and maximize the transmission of segments of the same SDU over the same grant. Similar rules can be designed for the application of LCP to NC PDUs.

In the following, are described embodiments wherein a WTRU, for example and non-exhaustively:

a) selects a single LCH from the LCHs carrying correlated NC PDUs for UL transmission over an UL grant based on the characteristics of carried NC PDUs/PDU sets by the LCHs and the UL grant configurations;

b) selects the NC PDUs/PDU sets to be allocated UL resources based on their characteristics and QoS parameters;

c) adjusts (increases or reduces) the PBR-based allocated resources to a LCH based on the characteristics and QoS parameters of the NC PDUs/PDU sets it carries and the decoding requirements at the receiver;

d) determines how to serve LCHs with equal priorities (order of serving them and amount of allocated resources to each LCH) based on characteristics and QoS parameters of the NC PDUs/PDU sets it carries and the decoding requirements at the receiver;

e) determines the LCH configuration to be applied while performing LCP based on the characteristics and QoS parameters of the NC PDUs/PDU sets it carries;

f) determines whether to deprioritize/skip allocating resources to a LCH carrying only redundant NC PDUs based on the QoS parameters of the redundant NC PDUs and feedback from the receiver; and g) determines how to serve LCHs in the second round of resource allocation (order of serving them and amount of allocated resources to each LCH) based on characteristics and QoS parameters of the NC PDUs/PDU sets it carries and the decoding requirements at the receiver.

Enhancements to LCP Procedure

According to embodiments, the LCP procedure may be enhanced to account for the requirements accompanying the introduction of network coding in a protocol layer above LCP (e.g. PDCP) including:

a) enabling the receiver to receive X linearly-independent NC PDUs or more to recover the X NC SDUs;

b) meeting the common delay budget requirements of NC PDUs belonging to the same NC generation;

c) supporting differentiated handling of NC PDUs with different characteristics.

Network coding including enhancements to LCP procedure to account for new packet processing requirements introduced by NC are not supported by the prior-art 3GPP radio protocols.

LCP—Selection of LCHs

Applying prior-art (legacy) LCP-LCH selection procedure (i.e., LCP mapping restrictions) when NC is introduced and activated in the PDCP layer may result in:

a) inefficient use of UL granted resources. For instance, a WTRU may select a LCH carrying redundant NC PDUs for UL transmission. However, the receiver may not need these NC PDUs for decoding the NC SDUs. In this case, the WTRU may send a larger number of NC PDUs than required for decoding the NC SDUs at the receiver; and b) limiting the anticipated performance gains of NC-based system operation. For instance, a WTRU may multiplex dependent/correlated NC PDUs with different characteristics (i.e., not identical/equally-generated) from different LCHs in the same UL grant which in turn limits the diversity gains that can be achieved when sending NC PDUs with different characteristics over different UL grants.

Accordingly, methods to enhance the LCP LCH selection of LCHs carrying NC PDUs/PDU sets from PDCP entities with activated NC processes (or "activated PDCP NC processes" or "PDCP NC processes") are desirable, to account for the new requirement accompanying the introduction of NC where:

a) only a subset of the generated NC PDUs is required for decoding (i.e., to receive x independent NC PDUs at the receiver);

b) support differentiated treatment of dependent/correlated NC PDUs transmitted over different LCHs to increase diversity gains and hence, improve transmission reliability.

LCP-Allocation of Resources

Applying prior-art LCP-resource allocation procedure when NC is introduced and activated in the PDCP layer may result in:

a) inefficient use of UL granted resources. For instance, since the prior-art resource allocation procedure is agnostic to the type of NC PDUs, a WTRU may allocate resources to (a1-a3):

a1) dependent NC PDUs that does not achieve the required rank for decoding at the receiver. This may lead to consuming a larger amount of UL resources to achieve the required rank for decoding at the receiver (Note that, firstly, the rank refers to the number of independent NC PDUs received by the receiver. The receiver needs to receive K independent NC PDUs to be able to construct K independent linear equations and decode the K NC SDUs. Secondly, is meant by this point that the prior art resource allocation procedure is agnostic to the correlation between different NC PDUs. Thus, the prior-art resource allocation procedure may allocate resources to dependent NC PDUs rather than allocating it to independent NC PDUs. In this case, the receiver may not have the required rank to perform decoding. Then, the transmitter will need to send more NC PDUs until the rank is achieved at the receiver to start the decoding. Accordingly, applying the prior art resource allocation procedure may lead to consuming larger amount of resources as larger number of NC PDUs may be transmitted to achieve the required rank for decoding at the receiver);

a2) redundant NC PDUs from the n-th NC generation instead of allocating resources to systematic or more-innovative NC PDUs from the (n+i)-th NC generation (i is an integer ≥1). This may delay or prohibit the decoding of NC SDUs from generation n+I;

a3) redundant NC PDUs from a LCH with high priority instead of allocating it to systematic or more-innovative NC PDUs from another LCH with lower priority. This may delay or prohibit the decoding of NC SDUs from LCHs with low priorities;

b) limiting the anticipated performance gains of NC-based system operation. For instance, the same LCH may carry NC PDUs with different characteristics. In this case, WTRU may multiplex them over the same UL grant which in turn limits the diversity gains that can be achieved when sending NC PDUs with different characteristics over different UL grants.

c) delaying/prohibiting decoding NC SDUs whose required NC PDUs for decoding belonging to LCHs with equal priorities. For example, dividing the resources equally between LCHs with equal priorities may lead to not sending all required NC PDUs for decoding any of the NC SDUs.

Accordingly, methods to enhance the LCP resource allocation procedure are desired to account for a requirement accompanying the introduction of NC where:

a) only a subset of the generated NC PDUs is required for decoding (i.e., to receive x independent NC PDUs at the receiver); and b) support differentiated treatment of dependent/corelated NC PDUs transmitting over same/different LCHs to increase diversity gains and hence improve transmission reliability.

Enhancements to LCP—Selection of LCHs (LCP Mapping Restrictions)—Summary

Details of embodiments can be found in further sections "Detailed description of embodiments" further on in the present document.

Assumption: the embodiments consider the case where output NC PDUs/PDU sets from an activated PDCP NC process belonging to the same NC generation have different characteristics (e.g., type and/or importance levels) and mapped to different RLC entities/LCHs based on their characteristics. In this case, the different LCHs associated with an activated PDCP NC process carry correlated/dependent NC PDUs/PDU sets. Note with regard to the use of the term "activate/activated": a deployed NC protocol in the PDCP protocol can be activated or deactivated based on one or more conditions (e.g., QoS requirements, radio conditions). When "activated", it is meant that the NC processing is applied to the input packets (i.e., NC SDUs).

In this disclosure, when evoking NC PDU, this implicitly indicates that the NC protocol in the PDCP protocol is activated. The term activated network coding and network coding will be used interchangeably.

Then, it is interesting to understand how a WTRU selects LCHs for UL transmission under the constraints that correlated/dependent NC PDUs/PDU sets belonging to different LCHs should not be multiplexed together in the same grant to enable diversity and improve transmission reliability.

According to an embodiment, the WTRU is configured with multiple LCHs associated with an activated PDCP NC process and carrying correlated/dependent NC PDUs/PDU sets with different characteristics. The WTRU selects a single LCH from the LCHs carrying correlated/dependent NC PDUs/PDU sets for UL transmission over an UL grant based on the characteristics (e.g., type and/or importance levels) of carried NC PDUs/PDU sets by the LCH, and the UL grant configurations/dynamic indication.

In a first step, a WTRU is configured with one or more of (a-c):

- First step a) mapping between output NC PDUs/PDU sets from an activated PDCP NC process belonging to the same NC generation and RLC entities/LCHs;
- First step b) additional mapping restriction rules for LCHs associated with an activated PDCP NC process and carrying correlated/dependent NC PDUs/PDU sets. The additional mapping restrictions rules are formulated as a function of NC PDUs/PDU sets characteristics (e.g., type and/or importance levels) and UL grant configurations (NB: the term "additional" mapping restriction rules should be understood within this context as additional to prior-art (legacy) mapping restriction rules);
- First step, c) UL grant (configured or dynamic grant) including characteristics (e.g., type and/or importance levels) of NC PDUs/PDU sets to be carried by the grant.

In a second step, when a new transmission is to be performed, the WTRU (a-d):

- Second step, a) determines the LCHs (i.e., LCH IDs) associated with an activated PDCP NC process and carrying correlated NC PDUs/PDU sets (i.e., the determined LCHs can form a large set of LCHs that can be divided into disjoint subsets. Each subset includes the LCHs associated with the same PDCP NC entity (process) and carrying correlated NC PDUs/PDU sets);
- Second step, b) applies prior-art LCH selection rules for all LCHs carrying PDUs or NC PDUs available for transmission;
- Second step, c) applies additional mapping restriction rules for the determined LCHs in step (a) above (the additional rules are applied for each one of the disjoint subsets of LCHs carrying correlated NC PDUs/PDU sets). For example, WTRU selects only one LCH of the LCHs carrying correlated NC PDUs/PDU sets for UL transmission over the same UL grant. For instance:
- Second step, sub-step c1) WTRU selects one of the LCHs for UL transmission over an UL grant based on the UL grant configurations (e.g., WTRU receives an UL grant indicating specific characteristics of NC PDUs/PDU sets. Then, WTRU selects the LCH carrying NC PDUs/PDU sets with the same characteristics indicated by the UL grant);
- Second step, sub-step c2) WTRU autonomously selects one of the LCHs for UL transmission over an UL grant (i.e., the received grant indicates that the WTRU should select the LCHs autonomously) based on the NC PDUs/PDU sets characteristics. For example (c2a-c2b):
- Second step, sub-step c2a) WTRU prioritizes the transmission of a LCH carrying the highest important NC PDUs/PDU sets (i.e., multiplexes data from the LCH carrying the highest important NC PDUs/PDU sets) over the current UL grant and restricts multiplexing other LCHs carrying less-important NC PDUs/PDU sets in the same grant;
- Second step, sub-step c2b) WTRU maps the different LCHs carrying correlated NC PDUs/PDU sets to different UL grants associated with different component carries (i.e., serving cells) based on inferred UL channel conditions by WTRU for each component carrier (e.g., WTRU selects the LCH carrying the highest important NC PDUs/PDU sets for UL transmission over an UL grant associated with the component carrier with favorable UL channel conditions, e.g., least number of HARQ retransmissions, etc.);
- Second step, d) performs resource allocation procedure, constructs MAC PDU, and transmits.

DETAILED DESCRIPTION OF EMBODIMENTS

Terminology

"Systematic NC PDU" refers to an NC PDU that represents one of the input NC SDUs (i.e., no coding is applied to generate a systematic NC PDU).

"Innovative NC PDU" refers to a coded NC PDU that is linearly independent from previously transmitted or received NC PDUs. The term "innovative" is to be understood here within the context of NC PDUs as a degree of complexity of the NC PDUs and is not to be understood as a measure of obviousness/non-obviousness of aspects of the invention.

"More-innovative NC PDU" refers to a coded NC PDU that includes information about a large number of input NC SDUs. In other words, refers to a coded NC PDU generated by coding a large number of input NC SDUs (i.e., the encoding vector used to generate a more-innovative NC PDU includes a large number of non-zero elements). More-innovative NC PDUs are useful for decoding a large number of source NC SDUs.

"Less-innovative NC PDU" refers to a coded NC PDU that includes information about a small number of input NC SDUs. In other words, refers to a coded NC PDU generated by coding a small number of input NC SDUs (i.e., the encoding vector used to generate a more-innovative NC PDU includes a large number of zero elements). More-innovative NC PDUs may be useful for decoding of few source NC SDUs.

"Redundant NC PDU" refers to an extra NC PDU that may not be required for recovering the NC SDUs at the receiver. For instance, when performing NC, WTRU may generate extra redundant NC PDUs, then, the WTRU may send one or more of these redundant NC PDUs for recovering one or more of the NC SDUs in case the receiver does not correctly receive one or more of the initially transmitted NC PDUs for decoding.

"First round of resource allocation" refers to the resource allocation phase in which WTRU allocates resources to the selected LCHs based on their configured PBR in a priority decreasing order.

"PBR-based allocated resources" refers to the allocated UL resources to a LCH based on its configured PBR.

"Second round of resource allocation" refers to the resource allocation phase in which a WTRU allocates remaining UL resources if any to LCHs after serving all LCHs with their configured PBR.

"Favorable channel conditions" may refer to one or more of high RSRP, high SINR (e.g., above a threshold), low number of HARQ retransmissions (e.g., below a threshold), more conservative MCS (e.g., low modulation order, low code rate), etc.;

"Poor channel conditions" may refer to one or more of low RSRP, low SINR (e.g., below a threshold), large number of HARQ retransmissions (e.g., above a threshold), less conservative MCS (e.g., high modulation order, high code rate), etc.;

"Configuration". In this disclosure, a WTRU is "configured with" may refer to the scenario that the WTRU receives a configuration from the gNB or another node (e.g., group coordinator WTRU). For the case that the WTRU receives configuration from the gNB, the WTRU may receive a dedicated RRC configuration or SIB from the gNB. For the case that the WTRU receives configuration from another node, the WTRU may receive configuration via sidelink communication (e.g., PC5 RRC).

"configured" or "(pre)-configured". A WTRU is "configured" or "(pre)-configured" to perform an action may also refer to the scenario that the WTRU is hard coded to perform the action via standard specifications.

Selecting a LCH for Resource Allocation

According to an embodiment, a WTRU determines whether to select a LCH carrying output NC PDUs/PDU sets from an activated PDCP NC process (i.e., NC PDUs/PDU sets that are output from a PDCP NC process that is active/activated/in function) for resource allocation by applying prior-art mapping restrictions rules and one or more mapping restrictions rules according to embodiments. The mapping restrictions rules according to embodiments aim to maintain the remaining delay budget requirements of PDUs/PDU sets, achieve higher transmission reliability, and efficiently use the UL granted resources.

In the following, are described embodiments according to which a WTRU may select a LCH associated with an activated PDCP NC process for UL transmission based on the QoS requirements of carried NC PDUs/PDU sets by the LCH.

In the following are disclosed additional mapping restrictions rules for selecting LCHs based on remaining delay budgets of NC PDUs/PDU sets they carry.

According to an embodiment, a WTRU may select a LCH carrying output NC PDUs/PDU sets from an activated PDCP NC process based on the remaining delay budget of its NC PDUs/PDU sets, the PUSCH transmission duration, and/or the uplink scheduling offset $k_2$ associated with a received UL grant. In other words, the WTRU may be configured with additional mapping restrictions rules that may be applied to decide whether or not to select a LCH carrying output NC PDU/PDU sets from an activated PDCP NC process. The additional mapping restrictions rules may be formulated as a function of one or more of the remaining delay budgets of NC PDUs/PDU sets, the PUSCH transmission duration, the uplink scheduling offset $k_2$ associated with a received UL grant. For example, the WTRU selects a LCH for UL transmission over an UL grant if (a-f):

a) remaining delay budgets of one or more of its NC PDUs/PDU sets do not expire before the end of PUSCH transmission duration;
b) remaining delay budgets of one or more of its NC PDUs/PDU sets are larger than the time offset represented by the parameter $k_2$ associated with a dynamic UL grant;
c) the maximum remaining delay budgets of its NC PDUs/PDU sets do not expire before the end of PUSCH transmission duration;
d) the maximum remaining delay budgets of its NC PDUs/PDU sets is larger than the time offset represented by the offset $k_2$ associated with a dynamic UL grant;
e) the minimum remaining delay budgets of its NC PDUs/PDU sets do not expire before the end of PUSCH transmission duration;
f) the minimum remaining delay budgets of its NC PDUs/PDU sets is larger than the time offset represented by the offset $k_2$ associated with a dynamic UL grant.

In the following, is discussed for which NC PDUs/PDU sets, the WTRU applies above rules.

According to an embodiment, a WTRU may be configured to use the individual, maximum, or minimum remaining delay budgets of one or more of the following while applying the above additional mapping restrictions rules for a LCH carrying output PDUs from an activated PDCP NC process (a-f):

a) Available NC PDUs for transmission when UL grant is received or when the WTRU performs LCH selection procedure;
b) Available NC PDU sets for transmission when UL grant is received or when the WTRU performs LCH selection procedure;
c) Available complete NC PDU sets only when UL grant is received or when the WTRU performs LCH selection procedure;
d) Available NC PDUs and other NC PDUs anticipated to be available for transmission at a certain time instant t before the PUSCH transmission duration;
e) Available NC PDU sets and other NC PDU sets anticipated to be available for transmission at a certain time instant t before the PUSCH transmission duration;
f) Available complete NC PDU sets and other complete NC PDU sets anticipated to be available for transmission at a certain time instant t before the PUSCH transmission duration.

In the following, is described how the WTRU determines the time instant t up to which the remaining delay budgets of NC PDUs/PDU sets or complete NC PDU sets anticipated to be available for transmission are considered for LCH selection.

According to an embodiment, the WTRU may be configured to determine the time instant t based on receiving one or more of the following (a-e):

a) a parameter indicating the absolute time difference (e.g., in ms) between the time instant of receiving the UL grant and the time instant t;
b) a parameter indicating the slot offset between the slot where the PDCCH for UL scheduling is received and the slot used for determining the time instant t;
c) a parameter indicating the slot offset between the slot where the scheduled PUSCH slot and the slot used for determining the time instant t;
d) a parameter indicating the symbol index for determining the time instant t within a certain time slot;
e) a parameter indicating the number of remaining symbols for the time instant t;

In the following, are described embodiments wherein a WTRU may select a LCH associated with an activated PDCP NC process for UL transmission based on the UL grant configurations.

In the following, are described configuration parameters according to embodiments, that are associated with UL grant (configured or dynamic).

A WTRU may be configured with an UL grant including one or more of (a-c):

a) type of NC PDUs/PDU sets to be carried by the UL grant. For instance, UL grant may include a string variable/vector indicating the allowed type(s) of NC PDUs/PDU sets that can be carried by the granted resources (e.g., systematic, coded, more-innovative, etc.);
b) importance/priority levels of NC PDUs/PDU sets to be carried by the UL grant. For instance, UL grant may include a threshold (e.g., an integer) indicating the minimum priority/importance level of NC PDUs/PDU sets to be carried by the granted resources. Alternatively, UL grant may include a maximum and minimum values (e.g., integers) reflecting the priority/importance range of NC PDUs/PDU sets to be carried by the granted resources;
c) one or more indicators (e.g., binary or Boolean) reflecting whether the grant can carry certain NC PDUs types (e.g., redundant NC PDUs allowed indicator, systematic NC PDUs allowed indicator, etc.). For instance, UL grant may include separate indicators for different NC PDU set types. Alternatively, UL grant may include a series of binary bits (bitmap) or Boolean values reflecting which NC PDUs/PDU sets can be carried over the granted resources. In the latter, the mapping between the NC PDU/PDU set type and the corresponding binary/Boolean value is known in prior to the WTRU, e.g., the WTRU may be configured with a certain order of NC PDU/PDU set types or the order may be hard-coded in the specs (one possible order is systematic, coded, more-important, less-important, redundant, etc.). Alternatively, the WTRU may be configured to order the NC PDU set types based on preconfigured importance/priority level for each NC PDU/PDU set type in a descending or ascending order, then, map each NC PDU/PDU set type to its corresponding indicator in the received bitmap or Boolean values;

In the following, is described that a WTRU determines whether to select a LCH based on the UL grant configuration parameters.

A WTRU may select a LCH for UL data transmission over granted UL resources if one or more of the following (a-e):

a) one or more of carried NC PDUs/PDU sets by LCH have types that match with one or more of listed NC PDU type(s) in a string variable/vector associated with the UL grant;
b) one or more of carried NC PDUs/PDU sets by LCH have importance/priority levels above a threshold value associated with the UL grant indicating the minimum priority/importance level of NC PDUs/PDU sets to be carried over the granted resources;
c) one or more of carried NC PDUs/PDU sets by LCH have importance/priority levels fall within a range of importance/priority levels allowed to be carried over the granted resources;
d) the corresponding binary or Boolean indicators of one or more of carried types of NC PDUs/PDU sets by LCH, associated with the grant are set to 1 or true;
e) the corresponding binary indicators of one or more of carried NC PDUs/PDU sets types by LCH, included in a bitmap associated with the grant are set to 1.

According to an embodiment, a WTRU may be configured with a minimum/maximum number of NC PDUs with specific characteristics (e.g., minimum number of systematic NC PDUs, maximum number of redundant NC PDUs, etc.). The WTRU can select the LCH if (a-c):

a) the UL grant allows carrying the NC PDU characteristics; and
b) the number of NC PDUs the LCH carries with these specific characteristics is above the corresponding configured minimum number of NC PDUs; or
c) the number of NC PDUs the LCH carries with these specific characteristics is below the corresponding configured maximum number of NC PDUs.

In the following, are described embodiments according to which a WTRU selects a single LCH from the LCHs carrying correlated/dependent NC PDUs/PDU sets for UL transmission over the same UL grant.

In the following, is described a differentiated handling of NC PDUs/PDU sets generated from a same PDCP NC process at PDCP layer.

A WTRU may be configured to apply differentiated handling to NC PDUs/PDU sets belonging to same NC generation to maximize performance benefit of network coding by enabling transmission of NC PDUs/PDU sets over channels that have low or no mutual correlation.

According to an embodiment, a WTRU may spread NC PDUs/PDU sets with different characteristics over different, possibly determined by configuration, LCHs with different LCP-related parameters, i.e., different priority, different PBR, etc. For instance, a WTRU may map x independent NC PDUs to a LCH (e.g., LCH with high priority, high PBR, etc.) and the remaining y-x NC PDUs to another LCH (e.g., LCH with low priority, low PBR, etc.).

Alternatively, the WTRU may map or assign NC PDUs to LCHs such that at most one NC PDU of a same NC PDU set is mapped to a given logical channel. In such case, the WTRU may determine the identity or sequence of the NC PDU within the NC PDU set to be mapped to a certain LCH according to a mapping configured by higher layers.

Alternatively, the WTRU may map or assign NC PDU sets to LCHs such that at most one NC PDU set of a same NC generation is mapped to a given LCH. In such case, the WTRU may determine the identity or sequence of the NC PDU set within the NC generation to be mapped to a certain LCH according to a mapping configured by higher layers.

In the following, are described mapping restrictions for LCHs carrying correlated/dependent NC PDUs/PDU sets.

A WTRU may be configured not to multiplex NC PDUs/PDU sets spread over different LCHs on the same UL granted resources (e.g., same TB). In other words, the WTRU may multiplex the NC PDUs/PDU sets from different LCHs on different TBs (e.g., send them over different component carriers (i.e., frequency diversity) or different time instants (i.e., time diversity)). Accordingly, for an available UL grant, the WTRU selects at most one LCH from the set of LCHs carrying correlated/dependent NC PDUs/PDU sets from same NC generation for UL transmission over this UL grant.

How does a WTRU select a single LCH of the multiple LCHs carrying correlated/dependent NC PDUs/PDU sets from same NC generation for UL transmission over an available UL grant?

In the following, is described that a WTRU selects a LCH from multiple LCH carrying correlated/dependent NC PDUs/PDU sets for UL transmission based on UL grant configurations.

According to an embodiment, the WTRU may select the LCH for UL transmission over an UL grant as a function of the UL grant configurations, LCH configurations, the characteristics (e.g., type and/or importance/priority level) of carried NC PDUs/PDU sets by each LCH. In other words, the WTRU may select a LCH for UL transmission over a certain UL grant as per the prior-art mapping restrictions rules and the additional mapping restrictions rules described above.

In the following, are described other rules for selecting a LCH for UL transmission.

In some scenarios, more than one LCH of the LCHs carrying correlated/dependent NC PDUs/PDU sets may satisfy all mapping restrictions rules. Consequently, a WTRU may apply additional rules to avoid multiplexing these LCHs over the same UL grant. The following describes other rules that the WTRU may apply to ensure the transmission of correlated/dependent NC PDUs/PDU sets over different transmission path (i.e., diversity path, TBs, UL grants, etc.). For instance, the WTRU may select a LCH for UL transmission over a certain UL grant based on characteristics of NC PDUs/PDU sets and/or at least one property of the UL grant or associated PUSCH(s). This may include at least one of (a-s):

a) Serving cell;
b) Carrier (normal UL or supplementary UL);
c) Bandwidth part (BWP);
d) Frequency domain resource assignment;
e) Time domain resource assignment;
f) Timing of the transmission;
g) Sub-carrier spacing;
h) Priority index;
i) Transmission configuration indicator (TCI) state;
j) SRS resource set indicator;
k) SRS resource indicator (SRI);
l) HARQ process identity;
m) Redundancy version;
n) Modulation and coding scheme;
o) Allowed PDU/PDU set types for the grant;
p) Allowed PDU/PDU set importance/priority levels for the grant;
q) A PUSCH repetition index;
r) A PUSCH occasion within a multi-PUSCH grant;
s) A type of grant such as configured grant type 1 or type 2, dynamic grant.

In the following, are discussed embodiments related to time-diversity.

A WTRU may be configured to multiplex correlated/dependent NC PDUs/PDU sets in different UL grants (e.g., TBs) at different time instants. According to an embodiment, the WTRU may be configured with a threshold representing minimum time difference between transmissions of correlated/dependent NC PDUs/PDU sets belonging to different LCHs. The WTRU may apply such restrictions when selecting LCHs for UL transmission.

In the following is described random allocation of LCHs with correlated NC PDU/PDU sets to UL grants at different time instants.

According to an embodiment, a WTRU may randomly map different LCHs to different UL grants at different time instants.

In the following is discussed allocation of LCHs with correlated NC PDU/PDU sets to UL grants based on characteristics of carried NC PDUs/PDU sets and one or more properties associated with the grant.

According to an alternative embodiment, a WTRU may select a LCH for UL transmission over an UL grant as a function of characteristics of carried NC PDUs/PDU sets by LCH, LCH configurations, one or more radio related measurements, inferred radio conditions, etc. For example (a-d):

a) the WTRU may select a LCH for a certain UL grant based on the priority of the LCH. For example, the WTRU may select the LCHs in a priority decreasing order (i.e., the WTRU selects the LCH with highest priority for UL transmission over the first available UL grant, the WTRU selects the LCH with second highest priority for UL transmission over the second available UL grant, etc.);
b) the WTRU may select a LCH carrying systematic, coded, more-innovative, or more-important NC PDUs/PDU sets for UL transmission over the first available grant and select a LCH carrying less-innovative, redundant, or less-important NC PDUs/PDU sets for UL transmission over later UL grants (UL grants at later time instants);
c) the WTRU may select a LCH carrying NC PDUs/PDU sets whose importance level is above a threshold for UL transmission over the first available grant and select a LCH carrying NC PDUs/PDU sets whose importance level is below a threshold for UL transmission over later UL grants (UL grants at later time instants);
d) the WTRU may be configured with different threshold for one or more of radio related measurements such as RSRP, RSRQ, RSSI, SINR, channel occupancy, etc. Then (d1-d4):
d1) the WTRU may select a LCH carrying NC PDUs/PDU sets whose importance level is above a threshold for UL transmission over an available UL grant if the WTRU experiences/infers favorable channel conditions for this UL grant. Favorable channel conditions may include one or more of high RSRP, high SINR (e.g., above a threshold), low number of HARQ retransmissions (e.g., below a threshold), more conservative MCS (e.g., low modulation order, low code rate), etc.;
d2) the WTRU may select a LCH carrying NC PDUs/PDU sets whose importance level is below a threshold for UL transmission over an available UL grant if the WTRU experiences/infers poor channel conditions for this UL grant. Poor channel conditions may include one or more of low RSRP, low SINR (e.g., below a threshold), large number of HARQ retransmissions (e.g., above a threshold), less conservative MCS (e.g., high modulation order, high code rate), etc.;

d3) the WTRU may select a LCH carrying systematic, coded, more-innovative, more-important NC PDUs/PDU sets for UL transmission over an available UL grant in case the WTRU experiences/infers favorable channel conditions for this UL grant;

d4) the WTRU may select a LCH carrying less-innovative, redundant, or less-important NC PDUs/PDU sets for UL transmission over an available UL grant in case the WTRU experiences/infers poor channel conditions for this UL grant.

In the following, are described embodiments related to frequency-diversity.

According to an embodiment, a WTRU may be configured with CA network coding wherein output correlated/dependent NC PDUs/PDU sets are carried by different LCHs. Then, the WTRU may map correlated/dependent NC PDUs/PDU sets to different component carriers (i.e., serving cells). In other words, LCHs carrying correlated/dependent NC PDUs/PDU sets will be selected for UL transmission over UL grants associated with different serving cells, the WTRU may receive multiple UL grants within one or more coinciding PDCCH occasions (i.e. on different Serving Cells).

In the following, is described an embodiment related to random allocation of LCHs with correlated NC PDU/PDU sets to UL grants associated with different serving cells.

According to an embodiment, a WTRU may randomly map different LCHs to different UL grants associated with different serving cells.

In the following, are described embodiments related to allocation of LCHs with correlated NC PDU/PDU sets to UL grants based on characteristics of carried NC PDUs/PDU sets and one or more properties associated with the grant. According to an alternative embodiment, a WTRU may select a LCH for UL transmission over an UL grant as a function of characteristics of carried NC PDUs/PDU sets by LCH, LCH configurations, one or more radio related measurements, inferred radio conditions, etc. For example, the WTRU may be configured with different threshold for one or more of radio related measurements such as RSRP, RSRQ, RSSI, SINR, channel occupancy, etc. Then, the WTRU maps the different LCHs to different UL grants associated with different component carriers based on reported/calculated radio measurements and inferred channel conditions (a-d):

a) the WTRU selects a LCH carrying systematic, more-innovative NC PDUs/PDU sets for UL transmission over an UL grant associated with the component carrier with most favorable channel conditions:

b) the WTRU selects a LCH carrying less-innovative, redundant, or less-important NC PDUs/PDU sets for UL transmission over an UL grant associated with the component carrier with poor channel conditions;

c) the WTRU maps different LCHs to different UL grants based on the importance levels of carried NC PDUs/PDU sets by each LCH and the radio conditions on the different component carriers. For instance, the WTRU selects the LCH carrying NC PDUs/PDU sets with highest importance level for UL transmission over the component carrier with most favorable channel conditions, the WTRU selects the LCH carrying NC PDUs/PDU sets with second highest importance level for UL transmission over the component carrier with second most favorable channel conditions, the WTRU selects the LCH carrying NC PDUs/PDU sets with least importance level for UL transmission over the component carrier with least favorable channel conditions, etc.;

d) the WTRU maps different LCHs to different UL grants based on the LCH priority and the radio conditions on the different component carriers. For instance, the WTRU selects the LCH with highest priority for UL transmission over the component carrier with most favorable channel conditions, the WTRU selects the LCH with second highest priority for UL transmission over the component carrier with second most favorable channel conditions, the WTRU selects the LCH carrying NC PDUs/PDU sets with least priority for UL transmission over the component carrier with least favorable channel conditions, etc.

In the following, is described selection of a LCH based on SCS.

According to an embodiment, a WTRU may select a LCH for UL transmission over an UL grant based on characteristics of carried NC PDUs/PDU sets and the associated SCS with the grant. For example (a-d):

a) the WTRU may select a LCH carrying systematic or more-innovative NC PDUs/PDU sets for UL transmission over UL grant configured with high SCS;

b) the WTRU may select a LCH carrying redundant NC PDUs/PDU sets for UL transmission over UL grant configured with low SCS;

c) the WTRU may select a LCH carrying NC PDUs/PDU sets with high importance/priority (i.e., above a threshold) for UL transmission over UL grant configured with high SCS;

d) the WTRU may select a LCH carrying NC PDUs/PDU sets with high importance/priority (i.e., below a threshold) for UL transmission over UL grant configured with low SCS;

In the following, is described selection of a LCH based on PUSCH repetitions.

According to an embodiment, a WTRU may select a LCH for UL transmission over an UL grant based on characteristics of carried NC PDUs/PDU sets and the PUSCH repetition configurations associated with the grant. For example (a-j):

a) the WTRU may select a LCH carrying systematic or more-innovative NC PDUs/PDU sets for UL transmission over UL grant configured with Type A or Type B PUSCH repetition;

b) the WTRU may select a LCH carrying redundant or less-innovative NC PDUs/PDU sets for UL transmission over UL grant not configured with PUSCH repetition;

c) the WTRU may select a LCH carrying systematic or more-innovative NC PDUs/PDU sets for UL transmission over UL grant configured with large number of PUSCH repetitions (e.g., above a threshold);

d) the WTRU may select a LCH carrying redundant or less-innovative NC PDUs/PDU sets for UL transmission over UL grant configured with low number of PUSCH repetitions (e.g., below a threshold);

e) the WTRU may select a LCH carrying NC PDUs/PDU sets with high importance/priority (i.e., above a threshold) for UL transmission over UL grant configured with PUSCH repetition;

f) the WTRU may select a LCH carrying NC PDUs/PDU sets with low importance/priority (i.e., below a threshold) for UL transmission over UL grant not configured with PUSCH repetition;

g) the WTRU may select a LCH carrying NC PDUs/PDU sets with high importance/priority (i.e., above a threshold) for UL transmission over UL grant configured with large number of PUSCH repetitions (e.g., above a threshold);
h) the WTRU may select a LCH carrying NC PDUs/PDU sets with low importance/priority (i.e., below a threshold) for UL transmission over UL grant not configured with low number of PUSCH repetitions (e.g., below a threshold);
i) the WTRU may select a LCH with high priority (i.e., above a threshold) for UL transmission over UL grant configured with PUSCH repetition;
j) the WTRU may select a LCH with low priority (i.e., below a threshold) for UL transmission over UL grant not configured with PUSCH repetition.

Serving LCHs Carrying Only Redundant NC PDUs

In the following, is described that a WTRU determines whether to select a LCH carrying only redundant NC PDUs/PDU sets for UL transmission through applying one or more configured mapping restriction rules according to embodiments, in addition to the prior-art mapping restrictions rules. In addition, the WTRU determines whether to deprioritize resource allocation to a selected LCH for resource allocation that carries only redundant NC PDUs/PDU sets based on one or more predefined conditions.

According to an embodiment, a WTRU may determine that a LCH carries only redundant NC PDUs/PDU sets as a function of one or more of NC configuration parameters.

According to an embodiment, a WTRU may determine that carried NC PDUs by a LCH are redundant NC PDUs based on one or more of NC configuration parameters (e.g., PSIHI, generation size, minimum number of required NC PDUs for decoding, etc.). For example, the WTRU may determine that a LCH carries only redundant NC PDUs if the PSIHI of the NC PDU sets belonging to this LCH are set to 0; and the WTRU already transmitted a number of NC PDUs equal to or larger than (a-b):

a) the configured generation size (i.e., number of input packets to the NC protocol);
b) the configured number of required NC PDUs for decoding the corresponding generation size.

According to an embodiment, a WTRU may be configured with a minimum number of required NC PDUs for decoding NC SDUs from the same NC generation. Alternatively, the WTRU may be configured with more than one value for the number of required NC PDUs for decoding. Then, the WTRU determines the value of the number of required NC PDUs for decoding based on one or more radio-related measurements. For example, the WTRU may be configured with different bounds on one or more of radio related measurements such as RSRP, RSRQ, RSSI, SINR, channel occupancy, etc. Also, the WTRU may be configured to apply a certain value for the number of required NC PDUs (i.e., consider a certain NC code rate) if one or more of its radio related measurements fall into the corresponding configured bound. For instance, the WTRU may be configured with a look up table indicating the different ranges of one or more of radio-related measurements and the corresponding NC code rate that leads to a minimum number of required NC PDUs for decoding.

According to an embodiment, a WTRU may determine that a LCH carrying only redundant NC PDUs/PDU sets based on mapping configurations between output NC PDU sets from PDCP NC process and the LCHs associated with this PDCP NC process. For example, the WTRU may be configured to map redundant NC PDU sets to a certain LCH with specific configurations (e.g., low priority, low PBR, etc.).

According to an embodiment, a WTRU may determine that a LCH carrying only redundant NC PDUs/PDU sets if the carried NC PDU sets having dependent NC PDU set integrated handling indicator(s) set to 0 (i.e., not required for decoding).

In the following, is described that a WTRU may select a LCH carrying redundant only NC PDUs/PDU sets for UL transmission based on UL grant configurations.

According to an embodiment, a WTRU may receive an UL grant (configured or dynamic UL grant) including redundant NC PDU allowed indicator. The redundant NC PDU allowed indicator may be a binary or a Boolean indicator reflecting whether the UL grant can carry redundant NC PDUs/PDU sets or not. Thus, additional mapping restriction rules may be specified as a function of the UL grant configurations. The WTRU may apply such mapping restrictions rules to decide whether or not to select a LCH carrying redundant NC PDUs only. For example, the WTRU selects a LCH carrying redundant NC PDUs/PDU sets only for UL transmission in an UL grant if (a-b):

a) the redundant NC PDUs allowed indicator associated with the UL grant is set to 1;
b) the redundant NC PDUs allowed indicator associated with the UL grant is set to true.

According to an embodiment, a WTRU may receive a bitmap indicating which types of NC PDUs can be carried over the UL grant. The WTRU can select a LCH carrying only redundant NC PDUs if the corresponding bit to the redundant NC PDUs in the received bitmap is set to 1.

In the following, is described that the WTRU may select a LCH carrying only redundant NC PDUs/PDU sets for UL transmission based on the QoS requirements associated with the redundant NC PDUs/PDU sets.

According to an embodiment, a WTRU may select a LCH carrying redundant NC PDUs/PDU sets only for UL transmission based on the remaining delay budget of the redundant NC PDUs/PDU sets carried by the LCH. For instance, the WTRU may be configured with additional mapping restriction rules as a function of the remaining delay budget of redundant NC PDUs/PDU sets. For example, the WTRU selects a LCH carrying only redundant NC PDUs/PDU sets for UL transmission in an UL grant if one or any combination of below conditions hold (a-h):

a) remaining delay budget of one or more of the redundant NC PDUs/PDU sets is below a threshold;
b) minimum remaining delay budget of the redundant NC PDUs/PDU sets is below a threshold;
c) maximum remaining delay budget of the redundant PDUs/PDU sets is below a threshold;
d) redundant NC PDUs/PDU sets belong to a LCH that triggered DSR;
e) redundant NC PDUs/PDU sets belong to a LCH that is about to trigger DSR (i.e., remaining time to trigger DSR is below a threshold);
f) one or more of redundant NC PDU sets triggered DSR (DSR in NC PDU set level);
g) one or more of redundant NC PDU sets about to trigger DSR (DSR in NC PDU set level);
h) discard timer of one or more of NC SDUs used to generate one or more of the redundant NC PDUs/PDU sets are below a threshold.

According to an embodiment, a WTRU may receive configurations indicating the time instant (minimum, maximum, average) of next possible UL grant. A WTRU may receive information about the next possible UL grant as a part of the UL grant configurations (e.g., NW informs the WTRU about the next possible UL grant it can give to the WTRU to carry the remaining NC PDUs if any). The WTRU may select the LCH for UL transmission if (a-e):

a) remaining delay budget of one or more of the redundant NC PDUs/PDU sets expires before the time instant of next possible UL grant;
b) minimum remaining delay budget of the redundant NC PDUs/PDU sets expires before the time instant of next possible UL grant;
c) maximum remaining delay budget of the redundant PDUs/PDU sets expires before the time instant of next possible UL grant.

According to an embodiment, a WTRU may be configured to select a LCH carrying only redundant PDUs if it enters survival time state and the redundant PDUs belong to a LCH associated with a DRB configured with survivalTimeStateSupport.

In the following, is described that a WTRU may select a LCH carrying only redundant NC PDUs/PDU sets for UL transmission based on inferred channel conditions.

Additional mapping restrictions rules based on Ack/Nack of NC SDUs are used to generate the redundant NC PDUs, Ack/Nack status of other NC PDUs from same NC generation of the redundant NC PDUs.

According to an embodiment, a WTRU may be configured to select a LCH carrying only redundant NC PDUs/PDU sets if:

a) the WTRU does not know/receive Ack/Nack status of one or more of the NC SDU(s) used to generate the redundant NC PDUs/PDU sets;
b) the WTRU does not know/receive Ack/Nack status of one or more of other NC PDUs/NC PDU sets previously transmitted from the same NC generation to which one or more of the redundant NC PDUs belong;
c) number of non-acknowledged NC SDUs used to generate the redundant NC PDUs/PDU sets is above a threshold;
d) number of non-acknowledged NC PDUs from the same NC generation, to which the redundant NC PDUs/PDU sets belong, is above a threshold;
e) number of acknowledged NC PDUs from the same NC generation, the redundant NC PDUs/PDU sets belong to is below a threshold;
f) instantaneous NC SDU set error rate of the DRB, the LCH is associated with, is above a threshold;
g) instantaneous NC PDU set error rate of the DRB, the LCH is associated with, is above a threshold.

Additional mapping restrictions rules may be based on HARQ retransmissions.

According to an embodiment, a WTRU may be configured to select a LCH carrying only redundant NC PDUs/PDU sets if the required NC PDUs/PDU sets for recovering the NC SDUs at the receiver are transmitted over a serving cell (i.e., component carrier) with large number of HARQ retransmissions (e.g., above a threshold).

Additional mapping restrictions rules as a function of one or more radio measurements.

According to an embodiment, a WTRU may be configured with different threshold for one or more of radio related measurements such as RSRP, RSRQ, RSSI, SINR, channel occupancy, etc. the WTRU may be configured with additional mapping restrictions rules for the selection of a LCH carrying only redundant PDUs as a function of one or more of the radio-related measurements measured at the transmitter or reported by the receiver. For example, the WTRU selects a LCH carrying only redundant PDUs the WTRU infers poor channel conditions.

In the following, is described that a WTRU may deprioritize resource allocation for a LCH carrying only redundant NC PDUs/PDU sets based on QoS requirements associated with the redundant NC PDUs/PDU sets.

According to an embodiment, a WTRU may be configured with conditions for deprioritizing the resource allocation of a LCH carrying only redundant NC PDUs/PDU sets for this transmission occasion as a function of remaining delay budget of redundant NC PDUs/PDU sets. For example, the WTRU deprioritizes resource allocation of a LCH carrying only redundant NC PDUs/PDU sets if one or any combination of below conditions hold:

a) minimum remaining delay budget of the redundant NC PDUs is above a threshold value;
b) redundant NC PDUs/PDU sets belong to a LCH that did not trigger DSR;
c) redundant NC PDUs/PDU sets belong to a LCH for which the remaining time to trigger a DSR is above a threshold;
d) none of the redundant NC PDU sets triggered DSR (DSR in NC PDU set level);
e) none of the redundant NC PDU sets is about to trigger DSR (minimum remaining delay budget to trigger DSR is above a threshold);
f) discard timer of one or more of NC SDUs used to generate one or more of the redundant NC PDUs/PDU sets are above a threshold.

In the following, is described that a WTRU may select a LCH carrying only redundant NC PDUs/PDU sets for UL transmission based on one or more channel quality-related metrics.

Additional conditions may be based on Ack/Nack of NC SDUs used to generate the redundant NC PDUs, Ack/Nack status of other NC PDUs from same NC generation of the redundant NC PDUs.

According to an embodiment, a WTRU may be configured with conditions for deprioritizing resource allocation for a LCH carrying only redundant NC PDUs/PDU sets if (a-e):

a) number of non-acknowledged NC SDUs used to generate the redundant NC PDUs/PDU sets is below a threshold;
b) number of non-acknowledged NC PDUs from the same NC generation, to which the redundant NC PDUs/PDU sets belong, is below a threshold;
c) number of acknowledged NC PDUs from the same NC generation, to which the redundant NC PDUs/PDU sets belong, is above a threshold;
d) instantaneous NC SDU set error rate of the DRB, the LCH is associated with is below a threshold;
e) instantaneous NC PDU set error rate of the DRB, the LCH is associated with is below a threshold.

Additional conditions may be based on HARQ retransmissions.

According to an embodiment, a WTRU may be configured with conditions for deprioritizing resource allocation for a LCH carrying only redundant NC PDUs/PDU sets if the required NC PDUs/PDU sets for recovering the NC SDUs at the receiver are transmitted over a serving cell (i.e., component carrier) with small number of HARQ retransmissions (e.g., below a threshold).

Additional condition may be based on one or more radio measurements.

According to an embodiment, a WTRU may be configured with different threshold for one or more of radio related measurements such as RSRP, RSRQ, RSSI, SINR, channel occupancy, etc. the WTRU may be configured with another condition for deprioritizing resource allocation for a LCH carrying only redundant PDUs as a function of one or more of the radio-related measurements measured at the transmitter or reported by the receiver. For example, the WTRU deprioritizes resource allocation to a LCH carrying only redundant NC PDUs/PDU sets for this transmission occasion if the WTRU infers favorable channel conditions.

In the following, is described that a WTRU may modify the importance/priority level of redundant NC PDUs/PDU sets based on Nack/Ack feedback from the receiver.

A WTRU may determine whether modifying the importance/priority level of redundant NC PDUs/PDU sets is enabled or not.

According to an embodiment, a WTRU may receive configurations from the NW indicating whether modifying (i.e., increasing) the importance/priority level of redundant NC PDUs/PDU sets is enabled or disabled (e.g., Boolean or binary indicator). This indicator may be configured per LCH reflecting whether the WTRU can modify the importance/priority level of redundant NC PDUs/PDU sets from this LCH. Alternatively, a WTRU may be configured with one indicator indicating whether modifying the importance/priority level of redundant NC PDUs/PDU sets is enabled or not for redundant NC PDUs/PDU sets from all LCHs. A WTRU may receive configurations including the list of LCHs (LCH IDs) for which modifying the importance/priority level of redundant NC PDUs/PDU sets is enabled/disabled. For example, a WTRU may receive the identities of LCHs for which modifying the importance/priority level of redundant NC PDUs/PDU sets is enabled/disabled. Alternatively, the WTRU may receive the identities of the first and last LCHs for which modifying the importance/priority level of redundant NC PDUs/PDU sets is enabled/disabled (the WTRU may assume that the LCHs whose identities fall between these two identities will be treated the same way).

Parameters may be used for increasing the importance/priority level of redundant NC PDUs/PDU sets.

According to an embodiment, a WTRU may be configured with one or more values representing the possible increase offsets in the priority/importance level of a redundant NC PDU/PDU set. These increase offsets may be configured per LCH or for all LCHs carrying redundant NC PDUs/PDU sets. The WTRU may receive configurations including the list of LCHs (LCH IDs) for which the increase offsets can be used. Alternatively, a WTRU may receive the identities of the first and last LCHs for which the increase offsets can be used.

According to an embodiment, a WTRU may be configured with one or multiple maximum value(s) for the priority/importance level of a redundant NC PDU/PDU set. A configured maximum value for the priority/importance level may be configured per LCH or for all LCHs carrying redundant NC PDUs/PDU sets. The WTRU may receive configurations including the list of LCHs (LCH IDs) for which a maximum value for the priority/importance level can be used. Alternatively, the WTRU may receive the identities of the first and last LCHs for which a maximum value for the priority/importance level can be used.

A WTRU may increase the importance/priority level of redundant NC PDUs/PDU sets.

According to an embodiment, a WTRU may be configured to increase the priority/importance level of a redundant NC PDU/PDU set if one or more of the following conditions hold (a-c):

a) number of non-acknowledged NC PDUs/PDU sets from the same generation is above a threshold;
b) instantaneous NC PDU set error rate is above a threshold;
c) remaining delay budget of the redundant NC PDU/PDU set is below a threshold.

According to an embodiment, a WTRU may select one of the configured offsets for increasing the priority/importance level of a redundant NC PDU/PDU set as a function of the number of the number of non-acknowledged NC PDUs/PDU sets, the required number of NC PDUs for decoding NC SDUs at the receiver.

Selecting NC PDUs/PDU Sets for Resource Allocation

A WTRU may determine whether to select NC PDUs/PDU sets for resource allocation or not. If yes, the WTRU may determine which NC PDUs/PDU sets shall be allocated UL resources in the first and second rounds for resource allocation based on one or more preconfigured conditions.

A WTRU may determine whether selection of NC PDUs/PDU sets to be allocated UL resources is allowed or not.

In the following, is described that a WTRU may determine whether to perform selection of NC PDUs/PDU sets for resource allocation based on NW command.

According to an embodiment, a WTRU may receive configurations from the NW indicating whether selection of NC PDUs/PDU sets for resource allocation is enabled or disabled (e.g., Boolean or binary indicator). This indicator may be configured per LCH reflecting whether the WTRU needs to select NC PDUs/PDU sets to be allocated resources from this LCH. Alternatively, the WTRU may be configured with one indicator indicating whether NC PDU/PDU set selection is enabled or not for all LCHs. The WTRU may receive configurations including the list of LCHs (LCH IDs) for which NC PDU/PDU set selection is enabled/disabled. For example, the WTRU may receive the identities of LCHs for which NC PDU/PDU set selection is enabled/disabled. Alternatively, the WTRU may receive the identities of the first and last LCHs for which NC PDU/PDU set selection is enabled/disabled (the WTRU may assume that the LCHs whose identities fall between these two identities will be treated the same way).

In the following, is described that a WTRU may determine to perform selection of NC PDUs/PDU sets for resource allocation based on one or more conditional commands.

According to an embodiment, a WTRU may be configured with one or more conditions based on which it decides whether or not it applies NC PDU/PDU set selection for resource allocation as a function of one or more of NC PDU sets characteristics, information, and QoS parameters. For example, the WTRU applies selection of NC PDUs/PDU sets from a LCH for resource allocation if one or any combination of below conditions hold (a-d):

a) LCH carries one or more NC PDU sets that include both required NC PDUs for decoding and one or more redundant NC PDUs;
b) LCH carries NC PDU sets with different characteristics (e.g., different types, different importance/priority levels, etc.)
c) LCH carries NC PDUs/PDU sets with different sizes;
d) LCH includes generated NC PDUs/PDU sets at later instant whose remaining delay budgets are less than NC PDUs/PDU sets generated at earlier time instant.

A WTRU may be configured with other conditions based on which it decides whether or not it applies NC PDU/PDU set selection for resource allocation as a function of the importance of the NC SDUs that generated these NC PDUs/

PDU sets. For example, the WTRU applies selection of NC PDUs/PDU sets from a LCH for resource allocation if: different NC PDUs/PDU sets carried by LCH are generated by NC SDU/SDU sets with different importance levels (the importance levels of application layer PDUs/PDU sets that generated carried NC PDUs/PDU sets by LCH are different).

Selection of NC PDUs/PDU sets to be allocated UL resources.

In the following, is described that a WTRU may select NC PDUs/PDU sets to be allocated UL resources based on NC PDU/PDU set information, characteristics, and QoS parameters.

According to an embodiment, a WTRU may be configured to select the NC PDUs/PDU sets to be allocated UL resources based on NC PDU/PDU set information, characteristics, and QoS parameters. For example, after the WTRU allocates resources to an LCH, it decides to which NC PDUs/PDU sets from this LCH, the resources shall be allocated. The WTRU may determine NC PDUs/PDU sets to be allocated the UL resources using one or any combination of below conditions. For instance, the WTRU selects (a-m):

a) NC PDUs/PDU sets with specific characteristics. For example, systematic NC PDUs/PDU sets; more-innovative NC PDUs/PDU sets; NC PDUs/PDU sets with highest importance/priority; NC PDUs/PDU sets with importance/priority above a threshold.
b) NC PDUs/PDU sets generated from NC SDUs/SDU sets with higher importance (i.e., application layer PDUs/PDU sets with higher importance);
c) NC PDU sets whose dependent NC PDU set integrated handling indicator is set to 1;
d) NC PDUs/PDU sets whose other correlated NC PDUs/PDU sets belonging to same or different LCH have not been served by the current UL grant;
e) NC PDUs belonging to NC PDU sets whose integrated handling indicator is set to 1;
f) NC PDUs/PDU sets that can achieve the required number of linearly independent NC PDUs (e.g., X linearly independent NC PDUs) at the receiver to recover the source NC SDUs (e.g., X input SDUs);
g) NC PDUs/PDU sets with most stringent remaining delay budget;
h) NC PDUs/PDU sets whose remaining delay budget below a threshold;
i) NC PDU sets triggered DSR;
j) NC PDU sets that are about to trigger DSR;
k) NC PDU sets that can be fully included in the allocated resources to the LCH (e.g., PBR-based allocated resources);
l) NC PDU sets from which all required NC PDUs for decoding can be fully included in the allocated resources to the LCH;
m) NC PDU sets that can be partially included in allocated resources in step 1, and has a remaining delay budget greater than a threshold.

In the following, a WTRU may select NC PDUs/PDU sets to be allocated UL resources based on Ack/Nack feedback from receiver.

According to an embodiment, a WTRU may be configured to select the NC PDUs/PDU sets to be allocated UL resources based on Ack/Nack feedback from the receiver. For example, the WTRU selects (a-d):

a) NC PDUs/PDU sets belonging to an NC generation with higher instantaneous NC PDU/PDU set error rate (i.e., instantaneous PDU/PDU set error rate above a threshold);
b) NC PDUs/PDU sets belonging to an NC generation includes a number of NC PDUs greater than or equal to the number non-acknowledged NC PDUs from this NC generation;
c) NC PDUs generated by coding NC SDUs used to generate one or more of non-acknowledged NC PDUs;
d) NC PDUs belonging to an NC generation and classified as more-innovative/more-important with respect to non-acknowledged NC PDUs from the same NC generation.

Adjusting PBR-Based Allocated Resources to an LCH

A WTRU may determine whether to adjust PBR-based allocated resources to a LCH carrying NC PDUs/PDU sets. If yes, the WTRU may increase or decrease PBR-based allocated resources to a LCH based on preconfigured conditions. Also, the WTRU may skip allocating PBR-based resources to LCHs carrying NC PDUs/PDU sets with specific characteristics.

A WTRU may determine whether to adjust PBR-based allocated resources to an LCH.

In the following, is described that a WTRU may determine whether to adjust PBR-based allocated resources to a LCH based on NW command.

According to an embodiment, a WTRU may receive configurations from the NW indicating whether adjusting PBR-based allocated resources to a LCH is enabled or disabled (e.g., Boolean or binary indicator). This indicator may be configured per LCH reflecting whether the WTRU can adjust the PBR-based allocated resources to this LCH. Alternatively, a WTRU may be configured with one indicator indicating whether adjusting PBR-based allocated resources is enabled or not for all LCH. The WTRU may be also with the list of LCHs for adjusting PBR-based allocated resources is enabled/disabled. For example, a WTRU may receive the identities of LCHs for which adjusting PBR-based allocated resources is enabled/disabled. Alternatively, a WTRU may receive the identities of the first and last LCHs for which adjusting PBR-based allocated resources is enabled/disabled (the WTRU may assume that the LCHs whose identities fall between these two identities will be treated the same way).

In the following, a WTRU may determine whether to adjust PBR-based allocated resources to a LCH based on one or more conditional commands.

According to an embodiment, a WTRU may be configured with one or more conditions based on which it decides whether to adjust PBR-based allocated resources to an LCH.

Conditions for increasing PBR-based allocated resources.

For instance, a WTRU may increase the PBR-based allocated resources to a LCH if (a-i):

a) allocated resources cannot carry all required NC PDUs/PDU sets for decoding one or more NC SDUs at the receiver;
b) allocated resources cannot carry all NC PDUs from an NC PDU set whose integrated handling indicator is set to 1;
c) one or more of existing NC PDUs/PDU sets in the LCH and not allocated resources have specific characteristics. For example, existing NC PDUs/PDU sets that have not been allocated resources: are more-innovative/systematic NC PDUs; have importance/priority level above a threshold.
d) the remaining delay budgets of one or more of existing NC PDUs/PDU sets belonging to the LCH and not allocated resources are below a threshold;

e) maximum/minimum remaining delay budgets of existing NC PDUs/PDU sets belonging to the LCH and not allocated resources are below a threshold;

f) remaining UL resources are greater than the size of remaining required NC PDUs/PDU sets for decoding one or more SDUs at the receiver;

g) LCH triggers DSR;

h) One or more of NC PDUs with no allocated resources triggered or a bout to trigger DSR;

i) LCH priority is above a threshold.

A WTRU may be also configured with extra conditions as a function of one or more of radio-related measurements performed by the WTRU or reported to the WTRU as well as inferred channel conditions by the WTRU. For example, the WTRU may increase the PBR-based allocated resources to a LCH if (a-d):

a) one or more of radio related measurements indicate poor channel conditions;

b) number of performed HARQ retransmissions for the serving cell associated with the UL grant is above a threshold;

c) number of performed RLC retransmissions is above a threshold;

d) time from start of first transmission for a HARQ process associated with the serving cell configured for the UL grant up to its completion exceeding a threshold.

According to an embodiment, a WTRU may receive configurations indicating the time instant (minimum, maximum, average) of next possible UL grant. The WTRU may receive information about the next possible UL grant as a part of the UL grant configurations (e.g., NW informs the WTRU about the next possible UL grant it can give to the WTRU to carry the remaining NC PDUs if any). The WTRU increase the PBR-based allocated resources to a LCH if (a-c):

a) remaining delay budget of one or more of its existing NC PDUs/PDU sets that have not been allocated resources expires before the time instant of next possible UL grant;

b) minimum remaining delay budget of its existing NC PDUs/PDU sets that have not been allocated resources expires before the time instant of next possible UL grant;

c) maximum remaining delay budget of its existing NC PDUs/PDU sets that have not been allocated resources expires before the time instant of next possible UL grant.

According to an embodiment, a WTRU may be configured to increase PBR-based allocated resources to a LCH if allocated resources cannot carry all required NC PDUs/PDU sets for decoding one or more NC SDUs at the receiver and the WTRU enters the survival time state and LCH is associated with a DRB configured with survivalTimeStateSupport;

Conditions for decreasing PBR-based allocated resources.

For instance, a WTRU may decrease the PBR-based allocated resources to a LCH if (a-e):

a) allocated resources carry all required NC PDUs for decoding SDUs as well as one or more redundant NC PDUs/PDU sets;

b) allocated resources carry all systematic and/or more-innovative NC PDUs/PDU sets as well as one or more redundant NC PDUs/PDU sets;

c) allocated resources carry larger number of NC PDUs than the required number for decoding the SDUs at the receiver;

d) allocated resources carry correlated/dependent NC PDU sets from the same LCH;

e) allocated resources carry one or more NC PDU sets correlated/dependent to other NC PDU sets allocated resources from other LCHs.

Conditions for Skipping Allocating PBR-Based Resources

For instance, a WTRU may skip allocating resources to a LCH if (a-b):

a) the LCH carries only redundant NC PDUs/PDU sets;

b) the LCH carries NC PDU sets correlated/dependent to other NC PDU sets allocated resources from other LCHs.

A WTRU may be configured with extra conditions as a function of one or more of radio-related measurements performed by the WTRU or reported to the WTRU as well as inferred channel conditions by the WTRU. For example, the WTRU may decrease the PBR-based allocated resources or skip allocating PBR-based resources to a LCH if (a-d):

a) one or more of radio related measurements indicate favorable channel conditions;

b) number of performed HARQ retransmissions for the serving cell associated with the UL grant is below a threshold;

c) number of performed RLC retransmissions is below a threshold;

d) time from start of first transmission for a HARQ process associated with the serving cell configured for the UL grant up to its completion is below a threshold.

A WTRU may increase PBR-based allocated resources to an LCH.

In the following, is described that a WTRU may determine the excess UL resources to be allocated to a LCH based on the information, characteristics, and QoS parameters of existing NC PDUs/PDU sets in the LCH with no allocated resources.

According to an embodiment, a WTRU may be configured to increase the allocated resources to a LCH so that the allocated resources become sufficient to carry (a-n):

a) all systematic and/or more-innovative NC PDUs/PDU sets;

b) a minimum number of systematic and/or more-innovative NC PDUs;

c) all NC PDUs/PDU sets with importance/priority level above a threshold;

d) a minimum number of NC PDUs/PDU sets with importance/priority level above a threshold;

e) existing NC PDUs/PDU sets whose remaining delay budgets below a threshold;

f) existing NC PDUs/PDU sets whose remaining delay budgets expire before the time instant of a next possible UL grant;

g) existing NC PDUs from partially served NC PDU sets whose integrated handling indicator is set to 1;

h) existing NC PDUs from partially served NC PDU sets, and required for decoding one or more NC SDUs at the receiver;

i) remaining segments of partially served NC PDUs required for decoding NC SDUs at the receiver;

j) existing NC PDU sets whose dependent NC PDU set integrated handling indicator is set to 1;

k) all NC PDUs/NC PDU set from a LCH whose priority is above a threshold;

l) a configured number of NC PDUs from an NC generation (e.g., this number may be based on a certain NC code rate to provide more redundancy for higher transmission reliability that enables proper recovery of NC SDUs at the receiver);

m) a configured number of NC PDUs from a specific NC PDU set (e.g., NC PDU set carrying NC PDUs with specific characteristics);

n) NC PDUs that can satisfy the required rank at the receiver to decode the NC SDUs.

A WTRU reduces PBR-based allocated resources to an LCH.

In the following, is described that a WTRU may determine the amount of UL resources to be reduced from the PBR-based allocated resources to a LCH based on the characteristics, and QoS parameters of NC PDUs/PDU sets to which UL resources are allocated.

According to an embodiment, a WTRU may be configured to reduce the allocated resources to a LCH so that the allocated resources become sufficient to (a-h):

a) carry only systematic NC PDUs/PDU sets from the LCH;

b) carry only NC PDUs/PDU sets whose importance/priority levels are above a threshold; c) avoid allocating resources to redundant NC PDUs/PDU sets;

d) avoid allocating resources to redundant and/or less-innovative NC PDUs/PDU sets whose remaining delay budget above a threshold;

e) avoid allocating resources to NC PDUs/PDU sets whose importance/priority levels are below a threshold;

f) allocate resources only to the minimum number of required NC PDUs for decoding SDUs at the receiver;

g) avoid allocate resources to NC PDU sets whose dependent NC PDU set integrated handling indicator is set to 0;

h) avoid allocating resources to correlated NC PDU sets over the same UL grant.

A WTRU skips allocating PBR-based resources to an LCH.

According to an embodiment, a WTRU may be configured to skip allocating PBR-based resources to a LCH to avoid (a-b):

a) allocating resources to redundant NC PDUs/PDU sets;

b) multiplexing dependent/correlated NC PDU sets over the same grant.

Serving LCHs with Equal Priorities

A WTRU may determine how to serve LCHs with equal priorities in the first and second rounds of resource allocation. For instance, the WTRU determines the order in which it serves LCHs with equal priorities based on preconfigured conditions. Also, the WTRU determines how to distribute the resources among LCHs with equal priorities based on preconfigured conditions.

A WTRU determines the order in which it serves LCHs with equal priorities.

In the following, is described that a WTRU may determine the order in which it serves LCHs with equal priorities based on the information, characteristics, and QoS parameters of carried NC PDUs/PDU sets by the LCHs.

According to an embodiment, a WTRU may be configured with one or more conditions indicating how it shall serve LCHs with equal priorities. For example, the WTRU serves first a LCH (a-j):

a) whose NC PDUs/PDU sets required for decoding one or more NC SDUs at the receiver have more stringent remaining delay budget (e.g., the WTRU serves first a LCH whose NC PDUs/PDU sets have the least minimum, maximum, or average remaining delay budget);

b) that triggered DSR;

c) that includes one or more NC PDU sets, partially served in a previous grant and have integrated handling indicator set to 1;

d) that includes one or more NC PDU sets, partially served in the first round of resource allocation and have integrated handling indicator set to 1;

e) carrying larger number of systematic and/or more-innovative NC PDUs/PDU sets required for decoding NC SDUs at the receiver;

f) whose NC PDUs/PDU sets have higher importance/priority level;

g) from which the available UL resources can carry at least one full NC PDU set;

h) that includes at least one complete NC PDU set;

i) from which, the required NC PDUs/PDU sets for decoding NC SDUs at the receiver fit within the available UL resources;

j) whose required NC PDUs/PDU sets for decoding NC SDUs at the receiver requires less UL resources.

According to an embodiment, a WTRU may be configured with one or more conditions indicating how it shall serve LCHs with equal priorities based on Ack/Nack feedback from the receiver. For example, the WTRU serves first a LCH (a-b):

a) with higher instantaneous NC PDU/PDU set error rate or NC SDU/NC SDU set error rate;

b) that includes larger number of NC PDUs carrying information about NC SDUs used to generate one or more of non-acknowledged NC PDUs.

According to an embodiment, a WTRU may receive configurations indicating the time instant (minimum, maximum, average) of next possible UL grant. The WTRU may receive information about the next possible UL grant as a part of the UL grant configurations (e.g., NW informs the WTRU about the next possible UL grant it can give to the WTRU to carry the remaining NC PDUs if any). The WTRU serves first an LCH: carrying larger number of NC PDUs/PDU sets whose remaining delay budgets expire before the time instant of next possible UL grant.

Allocating of UL Resources Among LCHs with Equal Priorities

In the following, is described that a WTRU may determine how to allocate UL resources among LCHs with equal priorities as a function of decoding requirements at the receiver.

According to an embodiment, a WTRU may be configured with one or more conditions indicating how it shall allocate UL resources among LCHs with equal priorities. For example, the WTRU allocates UL resources among LCHs with equal priorities in a way that (a-b):

a) allows sending the required NC PDUs/PDU sets for decoding equal number of NC SDUs from both LCHs;

b) maximizes the total number of recovered NC SDUs at the receiver.

For instance, the WTRU may not divide the resources equally among LCHs with equal priorities. However, the WTRU may allocate different UL resources so that the receiver can recover equal number of NC SDUs from both LCHs.

Alternatively, the WTRU may allocate the resources to one LCH only in case the required NC PDUs/PDU sets from this LCH for decoding NC SDUs at the receiver consume available UL resources (note: the WTRU may apply this approach to maximize the number of decoded SDUs at the receiver as splitting the resources among LCHs in this case may disable the receiver from decoding any of the NC SDUs).

Serving LCHs in Second Round of Resource Allocation

A WTRU may determine the order in which it serves LCHs in second round of resource allocation and determines the amount of resources to be allocated to each LCH based on preconfigured conditions.

A WTRU determines the order in which it serves LCHs.

A WTRU may determine the order in which it serves LCHs in second round of resource allocation based on the information, characteristics, and QoS parameters of carried NC PDUs/PDU sets by the LCHs.

According to an embodiment, a WTRU may be configured with one or more conditions indicating how it shall serve LCHs in second round of resource allocation. For example, the WTRU serves first a LCH (a-m):

a) whose NC PDUs/PDU sets required for decoding one or more NC SDUs at the receiver have more stringent remaining delay budget (e.g., the WTRU serves first a LCH whose NC PDUs/PDU sets have the least minimum, maximum, or average remaining delay budget);
b) that triggered DSR;
c) that includes one or more NC PDU sets, partially served in the first round of resource allocation and have integrated handling indicator set to 1;
d) carrying more-innovative or systematic NC PDUs/PDU sets;
e) carrying larger number of systematic and/or more-innovative NC PDUs/PDU sets required for decoding NC SDUs at the receiver;
f) whose NC PDUs/PDU sets have higher importance/priority level;
g) from which the remaining resources can carry at least one full NC PDU set;
h) from which, the required NC PDUs/PDU sets for decoding NC SDUs at the receiver fit within the available UL resources;
i) whose required NC PDUs/PDU sets for decoding NC SDUs at the receiver requires less UL resources;
j) carrying NC PDU sets whose dependent NC PDU set integrated handling indicator is set to 1;
k) that has been skipped in the first round of resource allocation (has not been allocated PBR-based resources);
l) carrying NC PDU sets not correlated with other NC PDU sets that have been allocated resources in the current grant;
m) that has a higher priority.

According to an embodiment, a WTRU may receive configurations indicating the time instant (minimum, maximum, average) of next possible UL grant. The WTRU may receive information about the next possible UL grant as a part of the UL grant configurations (e.g., NW informs the WTRU about the next possible UL grant it can give to the WTRU to carry the remaining NC PDUs if any). The WTRU serves first an LCH: carrying larger number of NC PDUs/PDU sets whose remaining delay budgets expire before the time instant of next possible UL grant.

A WTRU determines the amount of allocated resources to an LCH.

In the following, is described that a WTRU may determine the amount of resources to be allocated to a LCH in the second round of resource allocation based on the decoding requirements and the NC PDUs/PDU sets information.

According to an embodiment, a WTRU may be configured with one or more conditions indicating how it allocates resources to a LCH in the second round of resource allocation based on the decoding requirements and the NC PDUs/PDU sets information. For example, the WTRU serves a LCH until either (a-d):

a) all required NC PDUs for decoding from available complete NC PDU sets or the UL grant are exhausted;
b) all NC PDU sets whose dependent NC PDU set integrated handling indicator is set to 1 or the UL grant are exhausted;
c) all NC PDUs belonging to complete NC PDU sets with integrated handling indicator is set to 1 or the UL grant are exhausted;
d) all NC PDUs/NC PDU sets belonging to the LCH or the UL grant are exhausted;

Note: a WTRU may also select the NC PDUs/PDU sets to be allocated resources in the second round of resource allocation based on predefined conditions for selecting NC PDUs/PDU sets for resource allocation as captured in section "Adjusting PBR-based Allocated Resources to an LCH".

Determining LCP-Related LCH Configuration Parameters

A WTRU may determine one or more of LCH LCP-related configuration parameters (e.g., priority, PBR, etc.) based on characteristics and QoS parameters of carried NC PDUs/PDU sets by the LCH.

In the following, is described that a WTRU may determine LCP-related LCH configuration parameters characteristics and QoS parameters of carried NC PDUs/PDU sets by the LCH.

Mapping Conditions

According to an embodiment, for each LCH, the WTRU may be configured with conditions for mapping between different LCH configurations (e.g., with different LCP-related parameters) and one or more of (a-e):

a) types of carried NC PDUs/PDU sets (e.g., redundant, important, systematic, non-systematic, more-innovative, less-innovative NC PDUs/PDU sets);
b) importance/priority levels of carried NC PDUs/PDU sets (e.g., importance/priority of systematic NC PDUs/PDU sets, importance/priority of more-innovative NC PDUs/PDU sets, etc.);
c) different NC configurations (e.g., with different code rates, generation matrices, etc.);
d) remaining delay budget of carried NC PDUs/PDU sets required for decoding one or more NC SDUs at the receiver;
e) NC activation state.

The different LCH configurations may include different values for one or more of the following LCP-related LCH configuration parameters (a-:

a) Serving cell;
b) Carrier (normal UL or supplementary UL);
c) Bandwidth part (BWP);
d) Frequency domain resource assignment;
e) Time domain resource assignment;
f) Timing of the transmission;
g) Sub-carrier spacing;
h) Priority index;
i) Transmission configuration indicator (TCI) state;
j) SRS resource set indicator;
k) SRS resource indicator (SRI);
l) HARQ process identity;
m) Redundancy version;
n) Modulation and coding scheme;
o) Allowed PDU/PDU set types for the grant;
p) Allowed PDU/PDU set importance/priority levels for the grant;
q) A PUSCH repetition index;

r) A PUSCH occasion within a multi-PUSCH grant;

s) A type of grant such as configured grant type 1 or type 2, dynamic grant.

Also, the mapping could be one-to-many or one-to-one mapping. For instance, for each LCH, the WTRU may be configured with single/multiple LCH configurations for specific characteristics of NC PDUs/PDU sets (e.g., systematic NC PDUs/PDU sets, more-innovative NC PDUs/PDU sets, NC PDUs/PDU sets with importance/priority above a threshold etc.).

Determining LCH Configuration Parameters

According to an embodiment, for each LCH, the WTRU may determine the possible LCH configurations using the preconfigured mapping conditions and through determining one or more of the following for each LCH with available data for transmission (a-d):

a) the NC activation state of its associated PDCP NC entity (process);

b) the type of carried NC PDUs/PDU sets;

c) the remaining delay budget of carried NC PDUs/PDU sets;

d) the importance/priority levels of carried NC PDUs/PDU sets.

For example, after the WTRU determines the type or importance/priority level of carried NC PDUs/PDU sets by a LCH, it decides on the possible LCH configurations for this LCH. In case the LCH carries only redundant NC PDUs/PDU sets, the WTRU determines the possible LCH configuration(s) mapped to redundant NC PDUs/PDU sets (e.g., one or more configurations with low LCH priority, low PHY priority index, etc.).

Selecting One of the Possible LCH Configurations

If multiple LCH configurations are possible (e.g., there is one to many mapping between certain NC PDU type or importance/priority level and LCH configurations or the LCH carries NC PDUs/PDU sets with different characteristics), the WTRU selects one of the LCH configurations as a function of one or more of characteristics of NC PDUs/PDU sets (e.g., type and/or importance/priority level), QoS of NC PDUs/PDU sets (e.g., remaining delay budget), feedback from the receiver, radio-related measurements, inferred radio conditions, etc. For example (a-c):

a) In case a LCH carries only redundant or less-innovative NC PDUs/PDU sets, the WTRU determines the possible LCH configurations mapped to redundant or less-innovative NC PDUs/PDU sets, then (a1-a7):

a1) the WTRU selects the configuration with the least priority/PBR if remaining delay budget (i.e., minimum, average, maximum) of redundant NC PDUs/PDU sets is above a threshold;

a2) the WTRU selects a configuration with high priority/PBR if remaining delay budget (i.e., minimum, average, maximum) of redundant or less-innovative NC PDUs/PDU sets is below a threshold;

a3) the WTRU selects a configuration with low PHY priority index if remaining delay budget (i.e., minimum, average, maximum) of redundant or less-innovative NC PDUs/PDU sets is above a threshold;

a4) the WTRU selects a configuration with large PHY priority index if remaining delay budget (i.e., minimum, average, maximum) of redundant or less-innovative NC PDUs/PDU sets is below a threshold;

a5) the WTRU selects the configuration with the highest priority/PBR if number of non-acknowledged NC PDUs belonging to the same NC generation of the redundant or less-innovative NC PDUs is above a threshold;

a6) the WTRU selects a configuration with low priority/PBR if number of non-acknowledged NC PDUs belonging to the same NC generation of the redundant or less-innovative NC PDUs is below a threshold;

a7) etc.

b) In case a LCH carries only systematic/more-innovative NC PDUs/PDU sets, the WTRU determines the possible LCH configurations mapped to systematic/more-innovative NC PDUs/PDU sets (e.g., one or more configurations with high LCH priority, large PHY priority index, etc.), then (b1-b6):

b1) the WTRU selects the configuration with the highest priority/PBR if remaining delay budget (i.e., minimum, average, maximum) of systematic/more-innovative NC PDUs/PDU sets required for decoding one or more NC SDUs at the receiver is below a threshold;

b2) the WTRU selects a LCH configuration associated with a serving cell over which low number of HARQ retransmissions has been performed PBR if remaining delay budget (i.e., minimum, average, maximum) of systematic/more-innovative NC PDUs/PDU sets required for decoding one or more NC SDUs at the receiver is below a threshold;

b3) the WTRU selects a configuration with high PHY priority index if remaining delay budget (i.e., minimum, average, maximum) of systematic/more-innovative NC PDUs/PDU sets is below a threshold;

b4) the WTRU selects a configuration with high PBR if the WTRU experiences/infers poor channel conditions;

b5) the WTRU selects a configuration with large number of PUSCH repetitions PBR if the WTRU infers poor channel conditions;

b6) etc.

c) In case a LCH carries NC PDUs/PDU sets with various characteristics (c1-c9):

c1) the WTRU selects a LCH configuration with a high priority/PBR (e.g., above a threshold) if number of systematic and/or more-innovative NC PDUs/PDU sets is larger than number of redundant and/or less-innovative NC PDUs/PDU sets;

c2) the WTRU selects a LCH configuration with a high priority/PBR if number of systematic and/or more-innovative NC PDUs/PDU sets is above a threshold;

c3) the WTRU selects a LCH configuration with high PHY priority index if number of systematic and/or more-innovative NC PDUs/PDU sets is above a threshold;

c4) the WTRU selects a LCH configuration with a high priority/PBR if the remaining delay budget (i.e., minimum, average, maximum) of systematic and/or more-innovative NC PDUs/PDU sets is below a threshold;

c5) the WTRU selects a LCH configuration with low priority/PBR if number of redundant and/or less-innovative NC PDUs/PDU sets is larger than number of systematic and/or more-innovative NC PDUs/PDU sets;

c6) the WTRU selects a LCH configuration with low PHY priority index if number of systematic and/or more-innovative NC PDUs/PDU sets is above a threshold;

c7) the WTRU selects a LCH configuration with a low priority/PBR if number of redundant and/or less-innovative NC PDUs/PDU sets is above a threshold;

c8) the WTRU selects a LCH configuration associated with a serving cell over which low number of HARQ retransmissions has been performed if number of systematic and/or more-innovative NC PDUs/PDU sets is above a threshold;

c9) etc.

A WTRU may dynamically determine one or more of the LCP-related LCH configuration parameters.

According to an embodiment, a WTRU may dynamically change one or more of LCP-related LCH configuration parameters based on the characteristics and QoS parameters of carried NC PDUs/PDU sets, feedback from the receiver, radio-related measurements, inferred radio conditions, etc. For example (a-d):

a) a WTRU may be configured with a maximum, minimum, and default priority levels for an LCH. In addition, the WTRU may be configured with one or more offset(s) for temporarily increasing or reducing the LCH priority for a certain UL transmission occasion. The WTRU may be configured to increase/reduce the LCH priority or set it with the maximum or minimum configured LCH priority as a function of the characteristics of carried NC PDUs/PDU sets by the LCH. For instance (a1-a10):

a1) the WTRU reduces the LCH priority by a configured offset if the LCH includes only redundant and/or less-innovative NC PDUs/PDU sets;

a2) the WTRU sets the LCH priority with the minimum configured priority if the LCH includes only redundant NC PDUs/PDU sets;

a3) the WTRU reduces the LCH priority by a configured offset if the number of carried redundant and/or less-innovative NC PDUs by the LCH is above a threshold;

a4) the WTRU sets the LCH priority with the minimum configured priority if the number of carried redundant NC PDUs by the LCH is above a threshold;

a5) the WTRU reduces the LCH priority by a configured offset if the LCH is multiplexed into an UL grant that includes correlated NC PDUs/PDU sets to the ones carried by this LCH;

a6) the WTRU sets the LCH priority with the minimum configured priority if the LCH is multiplexed into an UL grant that includes correlated NC PDUs/PDU sets to the ones carried by this LCH;

a7) the WTRU increases the LCH priority by a configured offset if the LCH includes only systematic and/or more-innovative NC PDUs/PDU sets;

a8) the WTRU sets the LCH priority with the maximum configured priority if the LCH includes only systematic and/or more-innovative NC PDUs/PDU sets;

a9) the WTRU increases the LCH priority by a configured offset if the LCH carries one or more NC PDUs/PDU sets whose importance/priority levels are above a threshold;

a10) etc.

According to an embodiment, a WTRU may select one of the configured offsets for reducing/increasing the LCH priority as a function of the characteristics of carried NC PDUs/PDU sets and decoding requirements at the receiver.

b) the WTRU may be configured with a maximum, minimum, and default PBR values for an LCH. In addition, the WTRU may be configured with an offset for temporarily increasing or reducing the LCH PBR for a certain UL transmission occasion. The WTRU increases/reduces the LCH PBR or set it with the maximum or minimum configured LCH PBR as a function of the characteristics of carried NC PDUs/PDU sets by the LCH. For instance (b1-b12):

b1) the WTRU reduces the LCH PBR by a configured offset if the LCH includes only redundant NC PDUs/PDU sets;

b2) the WTRU sets the LCH PBR with the minimum configured PBR if the LCH includes only redundant NC PDUs/PDU sets;

b3) the WTRU reduces the LCH PBR by a configured offset if the number of carried redundant NC PDUs by the LCH is above a threshold;

b4) the WTRU sets the LCH PBR with the minimum configured priority if the number of carried redundant NC PDUs by the LCH is above a threshold;

b5) the WTRU reduces the LCH PBR by a configured offset if the LCH is multiplexed into an UL grant that includes NC PDUs/PDU sets correlated to the ones carried by this LCH;

b6) the WTRU sets the LCH PBR with the minimum configured priority if the LCH is multiplexed into an UL grant that includes NC PDUs/PDU sets correlated to the ones carried by this LCH;

b7) the WTRU increases the LCH PBR by a configured offset if the LCH includes only systematic and/or more-innovative NC PDUs/PDU sets;

b8) the WTRU sets the LCH PBR with the maximum configured priority if the LCH includes only systematic and/or more-innovative NC PDUs/PDU sets;

b9) the WTRU increases the LCH PBR by a configured offset if the LCH carries one or more NC PDUs/PDU sets whose importance/priority levels are above a threshold;

b10) the WTRU reduces the LCH PBR by a configured offset if the number of non-acknowledged NC PDUs belonging to the same NC generation of the redundant or less-innovative NC PDUs is below a threshold;

b11) the WTRU increases the LCH PBR by a configured offset if the number of non-acknowledged NC PDUs belonging to the same NC generation of the redundant or less-innovative NC PDUs is above a threshold;

b12) etc.

Note: According to an embodiment, a WTRU may select one of the configured offsets for reducing/increasing the LCH PBR as a function of the characteristics of carried NC PDUs/PDU sets and decoding requirements at the receiver.

c) the WTRU changes the allowed HARQ mode (e.g., to HARQ mode B) configured for a LCH if the LCH carries only redundant NC PDUs/PDU sets;

d) etc.

According to an embodiment, for each LCH, a WTRU may be configured with at least two sets of LCH configurations. One set includes LCH configurations, the WTRU may apply for sending the required NC PDUs/PDU sets for decoding NC SDUs at the receiver (i.e., receiving/sending x independent NC PDUs at/to the receiver for each NC generation). Another set includes LCH configurations, the WTRU may apply for sending the remaining NC PDUs/PDU sets generated by the NC protocol and may be required for decoding the NC SDUs at the receiver. For instance (a-b):

a) the WTRU first selects a LCH configuration that enables receiving/sending x independent NC PDUs at/to the receiver from the respective set based on UL radio conditions, remaining delay budget, etc.

b) Then, the WTRU switches the LCH configuration to a LCH configuration, it shall apply to send one or more of remaining NC PDUs/PDU sets. The WTRU selects the LCH configuration from the respective set based on feedback from the receiver, remaining delay budget, UL radio conditions, etc.

General Resource Allocation Rules

A WTRU applies one or more of the defined rules herein while performing resource allocation to a LCH carrying output NC PDUs/PDU sets from an activated PDCP NC process.

In the following, is described that a WTRU may apply general rules while performing resource allocation procedure for efficient use of UL resources towards facilitating NC SDUs decoding at the receiver.

A WTRU may be configured to apply one or more of the rules below while performing the resource allocation procedure (a-e):

a) the WTRU should not transmit only some of the required NC PDUs from a NC PDU set for decoding if all required NC PDUs for decoding from the NC PDU set fit into the remaining UL resources;

b) the WTRU should maximize the transmission of required NC PDUs for decoding over the available grant(s);

c) if any resources remain after performing the UL scheduling procedure above, the WTRU allocates them to one or more of NC PDUs previously allocated resources (i.e., allow repetition of an NC PDU in the same MAC PDU). The WTRU selects the NC PDUs to be reallocated resources as based on preconfigured conditions/mapping restrictions;

d) the WTRU shall not serve correlated/dependent NC PDU sets from same NC generation over the same UL grant;

e) the WTRU shall not allocate resources to redundant NC PDUs/PDU sets in the first round of resource allocation (i.e., redundant NC PDUs/PDU sets shall be allocated resources only in the second round of resource allocation).

EXAMPLE EMBODIMENTS

First Example Embodiment

In this first example embodiment, a WTRU may determine to select a LCH carrying output NC PDUs/PDU sets generated from an activated PDCP NC process based on the characteristics of NC PDUs/PDU sets (e.g., type, importance), correlation between NC PDUs/PDU sets belonging to different LCHs, and UL grant configurations.

Figure 5:
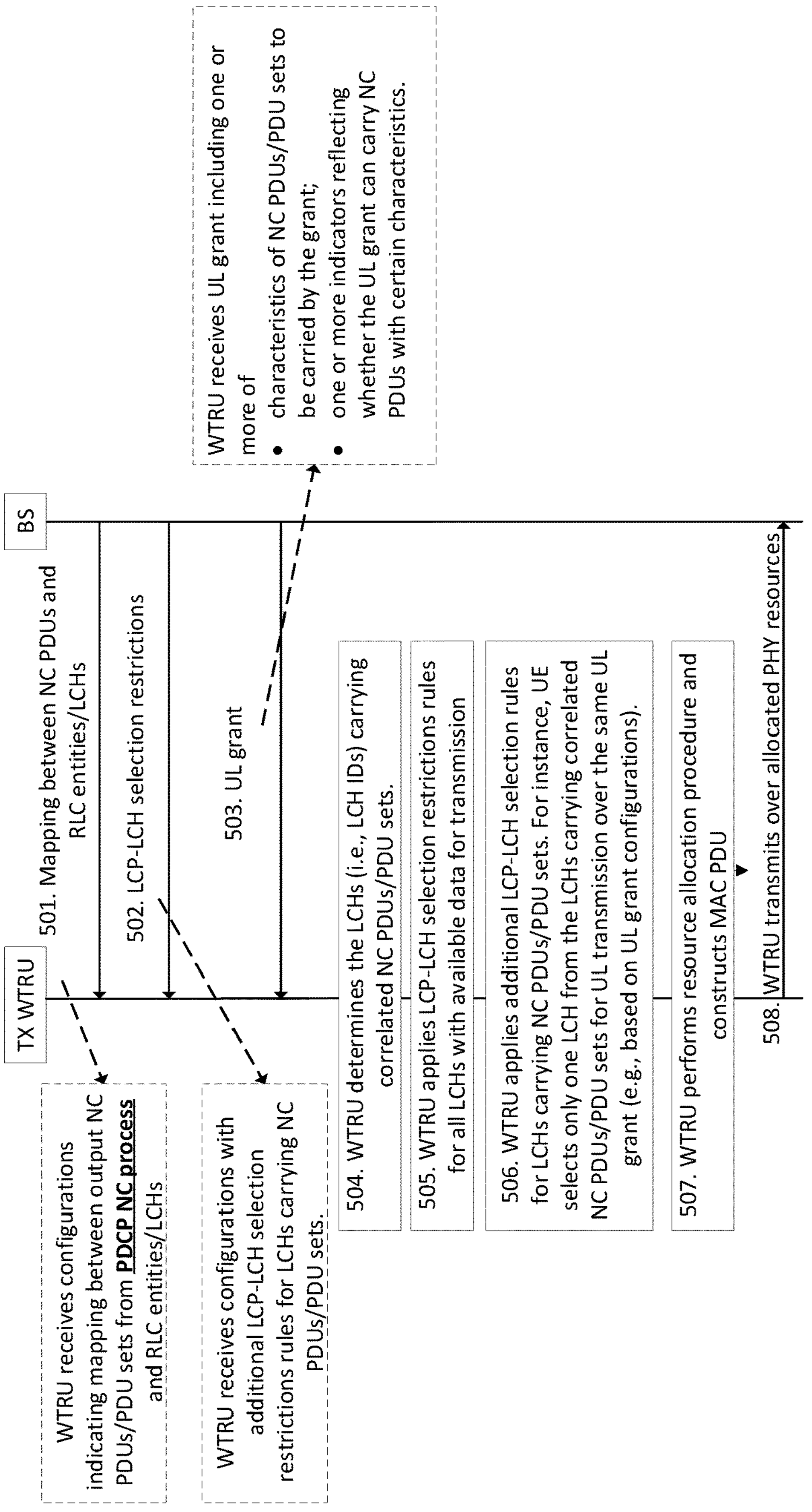
FIG. 5 is a sequence chart of WTRU selection of LCHs carrying NC PDUs/PDU sets for UL transmission.

FIG. 5 is a sequence chart of WTRU selection of LCHs carrying NC PDUs/PDU sets for UL transmission.

In 501, a WTRU is configured with one or more of (a-c):

a) mapping between output NC PDUs/PDU sets from an activated PDCP NC process and RLC entities/LCHs;

b) additional mapping restrictions rules for LCHs associated with an activated PDCP NC process and carrying correlated/dependent NC PDUs/PDU sets. The additional mapping restrictions rules are formulated as a function of NC PDUs/PDU sets characteristics (e.g., type and/or importance levels), QoS parameters (e.g., remaining delay budget) and UL grant configurations;

c) UL grant (configured or dynamic grant) including one or more of (c1-c2):

c1) characteristics (e.g., type and/or importance levels) of NC PDUs/PDU sets to be carried by the grant;

c2) one or more indicators (e.g., binary or Boolean) reflecting whether the UL grant can carry NC PDUs with certain characteristics (e.g., redundant NC PDUs allowed indicator, systematic NC PDUs allowed indicator, etc.);

In 502, when a new transmission is to be performed, the WTRU (a-d):

a) determines the LCHs (i.e., LCH IDs) associated with an activated PDCP NC process and the LCHs carrying correlated NC PDUs/PDU sets;

b) applies prior-art LCH selection rules for all LCHs carrying PDUs or NC PDUs available for transmission;

c) for a LCH associated with an activated PDCP NC process if any, the WTRU applies additional preconfigured mapping restriction rules for identified LCHs in step (a). For example (c1-c3):

c1) the WTRU selects a LCH associated with an activated PDCP NC process for UL transmission over an UL grant if remaining delay budgets of one or more of its NC PDUs/PDU sets required for decoding one or more NC SDUs at the receiver expires after end of PUSCH duration associated with the UL grant;

c2) the WTRU selects a LCH carrying only redundant NC PDUs/PDU sets for UL transmission over an UL grant if the redundant NC PDUs allowed indicator associated with the received UL grant is set to 1 or true;

c3) For LCHs carrying correlated NC PDUs/PDU sets, the WTRU selects only one of these LCHs for UL transmission over an UL grant. For instance (c3a-c3b):

c3a) the WTRU selects one of the LCHs based on the UL grant configurations (e.g., the WTRU receives an UL grant indicating specific characteristics of NC PDUs/PDU sets. Then, the WTRU selects the LCH carrying NC PDUs/PDU sets with the same characteristics indicated by the UL grant);

c3b) the WTRU autonomously selects one of the LCHs for UL transmission over an UL grant (i.e., the received grant indicates that the WTRU selects the LCHs autonomously) based on the NC PDUs/PDU sets characteristics. For example (c3b1-c3b2):

c3b1) the WTRU prioritizes the transmission of a LCH carrying the highest important NC PDUs/PDU sets (i.e., multiplexes data from the LCH carrying the highest important NC PDUs/PDU sets) over the current UL grant and restricts multiplexing other LCHs carrying less-important NC PDUs/PDU sets in the same grant;

c3b2) the WTRU maps the different LCHs carrying correlated NC PDUs/PDU sets to different UL grants associated with different component carries (i.e., serving cells) based on inferred channel conditions by the WTRU for each component carrier (e.g., the WTRU selects the LCH carrying the highest important NC PDUs/PDU sets for UL transmission over an UL grant associated with the component carrier with favorable channel conditions, e.g., least number of HARQ retransmissions.

In 507, the WTRU performs resource allocation procedure, constructs MAC PDU; and In 508, the WTRU transmits the constructed MAC PDU. Note that the MAC PDU consists of one or more MAC subPDUs. Each MAC subPDU:

a MAC subheader only (including padding);

a MAC subheader and a MAC SDU;

a MAC subheader and a MAC CE;

a MAC subheader and padding.

A MAC SDU comprises multiplexed NC PDUs after LCP resource allocation.

Second Example Embodiment

In this second example embodiment, a WTRU may perform one or any combination of the following based on preconfigured conditions. The WTRU decides whether to deprioritize resource allocation to selected LCHs carrying only redundant NC PDUs/PDU sets, decides on the order in which it serves selected LCHs with equal priorities, selects the NC PDUs/PDU sets to be allocated UL resources, adjusts the PBR-based allocated resources, determines the order in which it serves LCHs in the second round of resource allocation and the amount of resources to be allocated to each LCH.

Figure 6:
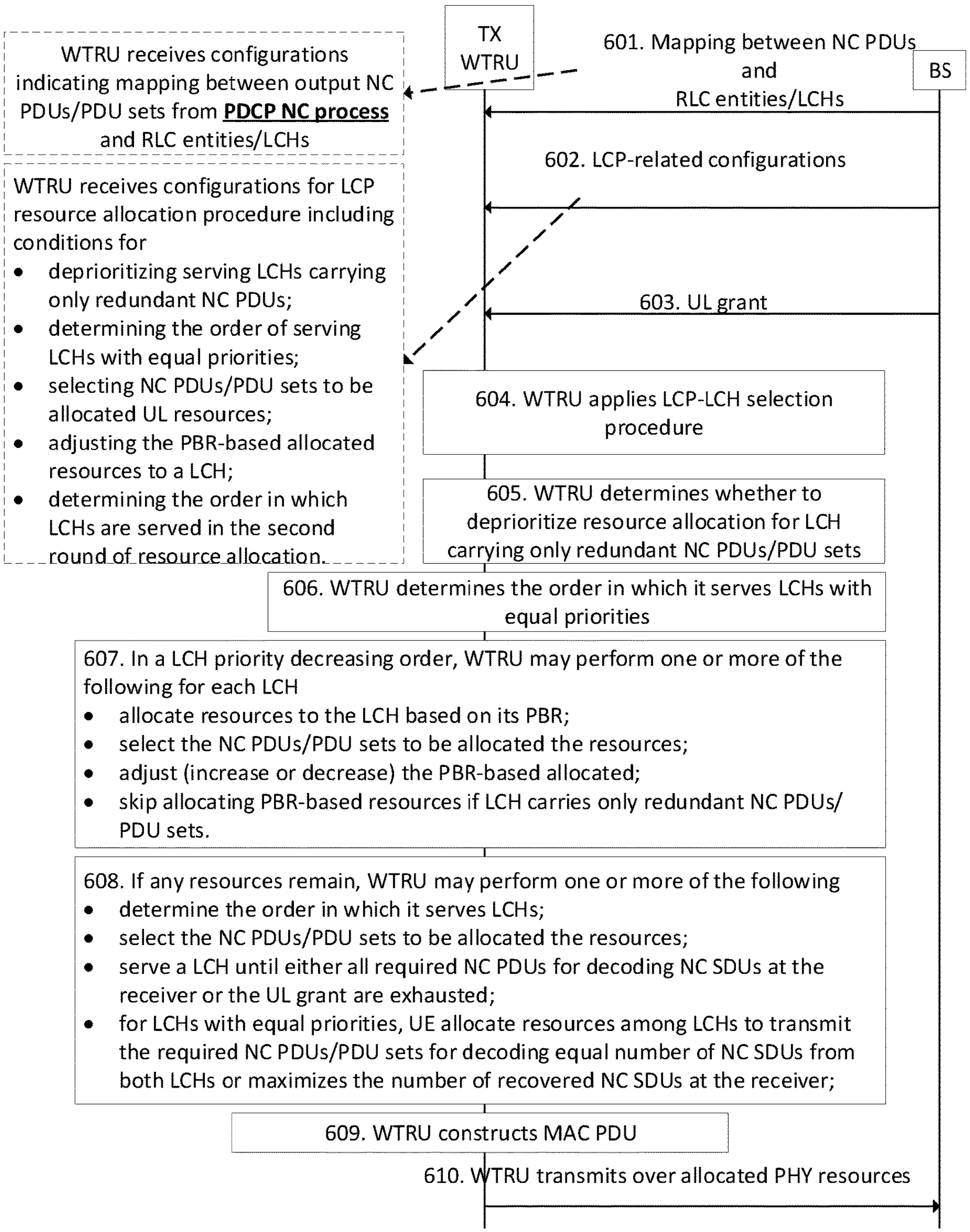
FIG. 6 is a sequence chart of a resource allocation procedure for LCHs carrying NC PDUs/PDU sets.

FIG. 6 is a sequence chart of a resource allocation procedure for LCHs carrying NC PDUs/PDU sets.

In 601, the WTRU is configured with mapping between generated NC PDUs/PDU sets from PDCP NC process and RLC entities/LCHs.

In 602, the WTRU is configured with (a-f):

a) one or any combination of below conditions as a function of one or more of NC PDU set information, characteristics, and QoS parameters, UL grant configurations b) Conditions for deprioritizing LCHs carrying only redundant NC PDUs;

c) Conditions for determining the order in which LCHs with equal priorities are served;

d) Conditions/mapping restrictions for selecting NC PDUs/PDU sets to be allocated UL resources;

e) Conditions for adjusting the allocated resources to a LCH based on its PBR;

f) Conditions for determining the order in which LCHs are served in the second round of resource allocation (i.e., after serving all LCHs based on PBR).

In 603, when a new transmission is to be performed, the WTRU (a-c):

a) determines the LCHs (i.e., LCH IDs) associated with an activated PDCP NC process and LCHs carrying correlated NC PDUs/PDU;

b) (step 604) applies LCH selection procedure;

c) applies resource allocation procedure wherein the WTRU performs one or any combination of the following (c1-c):

c1) (step 605) deprioritizes resource allocation of one or more of selected LCHs carrying redundant NC PDUs only based on preconfigured conditions (e.g., the WTRU deprioritizes resource allocation for a LCH carrying only redundant NC PDUs/PDU sets for this transmission occasion if the remaining delay budget of the redundant NC PDUs/PDU sets is above a threshold);

c2) (step 606) determines the order in which it serves LCHs with equal priorities based on preconfigured conditions (e.g., the WTRU serves first a LCH carrying larger number of systematic and/or more-innovative NC PDUs/PDU sets);

c3) (step 607) for a selected LCH, allocates UL resources based on its PBR;

c4) (step 607) selects the NC PDUs/PDU sets to be allocated UL resources based on preconfigured conditions/mapping restrictions (e.g., the WTRU selects NC PDUs/PDU sets with higher importance such as systematic NC PDUs/PDU sets);

c5) (step 607) adjusts allocated resources to a LCH based on preconfigured conditions. For example (c1-c6):

c1) (step 607) the WTRU increases the PBR-based allocated resources so that it becomes sufficient to carry all NC PDUs belonging to same NC PDU set, all required NC PDUs/PDU sets for decoding, or more redundant NC PDUs if remaining delay budget of NC PDU set is below a threshold;

c2) (step 607) the WTRU reduces the PBR-based allocated resources to a LCH so that the allocated resources can carry only required NC PDUs/PDU sets for decoding one or more NC SDUs at the receiver, systematic/more-innovative NC PDUs/PDU sets (e.g., avoid allocating resources to redundant NC PDUs/PDU sets);

c3 (step 607) the WTRU skips allocating PBR-based resources to a LCH carrying only redundant NC PDUs/PDU sets.

In 608, if any resources remain after serving all LCHs with at least required resources based on their PBR, the WTRU performs one or any combination of the following (c6a-c6e):

c6a) (step 608*a*) determines the order in which it serves LCHs based on preconfigured conditions (e.g., the WTRU serves first a LCH carrying more-innovative or systematic NC PDUs/PDU sets);

c6b) (step 608) selects the NC PDUs/PDU sets to be allocated UL resources based on preconfigured conditions/mapping restrictions;

c6c) (step 608) serves a LCH until either all required NC PDUs for decoding from available complete NC PDU sets or the UL grant are exhausted;

c6d) (step 608) serves all selected LCHs in a strict decreasing priority until either data for that LCH or UL grant is exhausted, whichever comes first;

c6e) (step 608) for LCHs with equal priorities, resources may be allocated in a way that (c6e1-c6e2):

c6e1) (step 608) allows the WTRU to transmit the required NC PDUs/PDU sets for decoding equal number of NC SDUs from both LCHs;

c6e2) (step 608) maximizes the number of recovered NC SDUs at the receiver.

In 609, the WTRU constructs MAC PDU; and

In 610, the WTRU transmits the MAC PDU.

Third Example Embodiment

In this third example embodiment, a WTRU may perform NC-based resource allocation procedure according to embodiments, wherein the WTRU may allocate UL resources among LCHs over K rounds of resource allocation. In each round, the WTRU allocates UL resources to LCHs in a priority decreasing order, allocates UL resources to a LCH associated with activated PDCP NC process at a certain resource allocation round based on a configured priority/importance level or NC PDU/PDU set type. the WTRU allocates UL resources to a LCH not associated with activated PDCP NC process in the first and last resource allocation rounds.

Steps:

1. The WTRU is Configured with (a-b):

a) one or any combination of below conditions as a function of one or more of NC PDU set information, characteristics, and QoS parameters (a1-a3):

a1) Conditions for determining the order in which LCHs with equal priorities are served;

a2) Conditions/mapping restrictions for selecting NC PDUs/PDU sets to be allocated UL resources;

a3) Conditions for temporarily adjusting priority/importance level of certain NC PDUs/PDU sets (e.g., redundant, less-innovative, etc.) for resource allocation;

b) UL grant including one or more of (b1-b3):

b1) number of NC-based resource allocation rounds (e.g., K);

b2) importance levels of NC PDUs/PDU sets to be allocated in each round (e.g., a threshold indicating the minimum importance level of NC PDUs/PDU sets served by each round of resource allocation);

b3) type of PDUs/PDU sets to be allocated resources in each round.

2. When a New Transmission is to be Performed, the WTRU (a-d):

a) determines the LCHs (i.e., LCH IDs) associated with an activated PDCP NC process;

b) applies LCH selection procedure;

c) applies resource allocation procedure wherein the WTRU performs one or any combination of the following (c1-c3):

c1) determines the order in which it serves LCHs with equal priorities based on preconfigured conditions.

c2) temporarily modifies importance/priority level of one or more of NC PDUs/PDU sets based on preconfigured conditions. For example (c2a-c2b):

c2a) the WTRU is configured with: an indicator for enabling modifying priority/importance level of redundant and/or less-innovative NC PDUs/PDU sets; one or more values representing the possible increase offset in the priority/importance level of a redundant and/or less-innovative NC PDU/PDU set; a maximum value for the priority/importance level of a redundant and/or less-innovative NC PDU/PDU set.

c2b) the WTRU increases the priority/importance level of a redundant/less-innovative NC PDU/PDU set if one or more of the following conditions hold: remaining delay budget of the redundant/less-innovative NC PDU/PDU set is below a threshold; number of non-acknowledged NC PDUs/PDU sets from the same generation is above a threshold.

c3) performs K rounds of resource allocation (K is the number of configured NC-based resource allocation rounds) among selected LCHs wherein (c3a-c3c):

c3a) in the first round, the WTRU serves all selected LCHs in a priority decreasing order and: allocates UL resources to a LCH not associated with an activated PDCP NC process based on its PBR; for a LCH associated with an activated PDCP NC process, allocates UL resources that can carry from this LCH all or selected NC PDUs/PDU sets (i.e., based on preconfigured conditions/mapping restrictions) with configured importance level and/or NC PDU type for first round of resource allocation.

c3b) then, for any round i=2, . . . , K−1, if any resources remain, the WTRU serves only LCHs associated with an activated PDCP NC process in a priority decreasing order where the WTRU allocates to each LCH UL resources that can carry from a LCH all or selected NC PDUs/PDU sets (i.e., based on preconfigured conditions/mapping restrictions) with the corresponding configured importance level and/or type for this resource allocation round;

c3c) for round K, if any resources remain, the WTRU serves all LCHs in a priority decreasing order where (c3c1-c3c2):

c3c1) for a LCH not associated with an activated PDCP NC process, the WTRU serves the LCH until either data for that LCH or UL grant is exhausted, whichever comes first;

c3c2) for a LCH associated with an activated PDCP NC process, the WTRU serves the LCH until: either NC PDUs/PDU sets with configured importance level and/or type for this round of resource allocation from that LCH or UL grant is exhausted, whichever comes first; or either data for that LCH or UL grant is exhausted, whichever comes first.

d) constructs MAC PDU and transmits the MAC PDU.

Fourth Example Embodiment

In this fourth example embodiment, a WTRU may determine the LCH configuration to be applied when performing LCP procedure based on characteristics and QoS parameters of carried NC PDUs/PDU sets by the LCH. In addition, the WTRU may dynamically change one or more of LCH configuration parameters based on the characteristics of NC PDUs/PDU sets carried by the LCH.

Steps (1-2):

1) the WTRU is Configured with One or More of the Following (a-b):

a) Different configurations (e.g., with different LCP parameters) for a LCH associated with PDCP NC process.

b) Conditions for mapping between different LCH configurations and one or more of (b1-b2):

b1) types of carried NC PDUs/PDU sets (e.g., redundant, important, systematic, non-systematic, more-innovative, less-innovative NC PDUs/PDU sets);

b2) importance/priority of NC PDUs/PDU sets (e.g., importance/priority of systematic NC PDUs/PDU sets, importance/priority of more-innovative NC PDUs/PDU sets, etc.);

The mapping could be one-to-many mapping (e.g., multiple LCH configurations for systematic NC PDUs, etc.).

2) when a New Transmission is to be Performed, the WTRU (a-d):

a) identifies one or more of the following (a1-a3):

a1) the type of carried NC PDUs/PDU sets by LCHs;

a2) the remaining delay budget of NC PDUs/PDU sets;

a3) the importance of NC PDUs/PDU sets;

b) determines the LCH configuration parameters to be applied when performing LCP procedure for UL transmission. For example, WTRU performs one or more of the following to determine the LCH configuration parameters (b1-b3):

b1) the WTRU uses one or more of the identified parameters in previous step and preconfigured mapping conditions to determine the possible configuration(s) for an LCH. For instance, in case a LCH carries NC PDUs/PDU sets with a specific type, the WTRU uses the preconfigured mapping conditions between LCH configurations and type of NC PDUs to identify the possible LCH configuration(s). For example (b1a-b1b):

b1a) In case the LCH carries redundant NC PDUs/PDU sets only, the WTRU identifies the LCH configuration(s) mapped to redundant NC PDUs/PDU sets (e.g., one or more configurations with low LCH priority). Then, the WTRU selects one of the LCH configurations as a function of feedback, remaining delay budget of redundant NC PDUs/PDU sets, etc. For instance, the WTRU selects the configuration with the highest priority/PBR if number of non-acknowledged NC PDUs belonging to the same NC generation of the redundant NC PDUs is above a threshold;

b1b) In case a LCH carries systematic NC PDUs/PDU sets only, the WTRU identifies the LCH configuration(s) mapped to systematic NC PDUs/PDU sets (e.g., one or more configurations with high LCH priority). Then, the WTRU selects one of the LCH configurations as a function of remaining delay budget of systematic NC PDUs/PDU sets, radio conditions, etc. For instance, the WTRU selects the configuration with the highest PBR if it experiences poor channel conditions;

b2) the WTRU decides on LCH configurations based on the importance/priority levels and/or types of NC PDUs/PDU sets it carries. For example (b2a-b2b):

b2a) the WTRU selects a LCH configuration with high priority/PBR (e.g., above a threshold) if number of systematic and/or more-innovative NC PDUs/PDU sets is larger than number of redundant and/or non-innovative NC PDUs/PDU sets;

b2b) the WTRU selects a LCH configuration with low priority/PBR (e.g., below a threshold) if number of redundant and/or less-innovative NC PDUs/PDU sets is larger than number of systematic and/or more-innovative NC PDUs/PDU sets;

b3) the WTRU dynamically changes one or more of LCH configuration parameters as a function of the importance/priority levels and/or types of NC PDUs/PDU sets it carries. For example (b3a-b3b):

b3a) the WTRU reduces the configured priority/PBR for a LCH if all existing NC PDUs/PDU sets in the LCH are redundant NC PDUs/PDU sets;

b3b) the WTRU increases the configured priority/PBR for a LCH if the number of systematic and/or more-innovative NC PDUs/PDU sets carried by the LCH is above a threshold;

c) uses the selected LCH configuration in previous step to perform the prior-art LCP procedure including LCH selection and resource allocation procedures.

d) constructs MAC PDU and transmits the MAC PDU.

Figure 7:
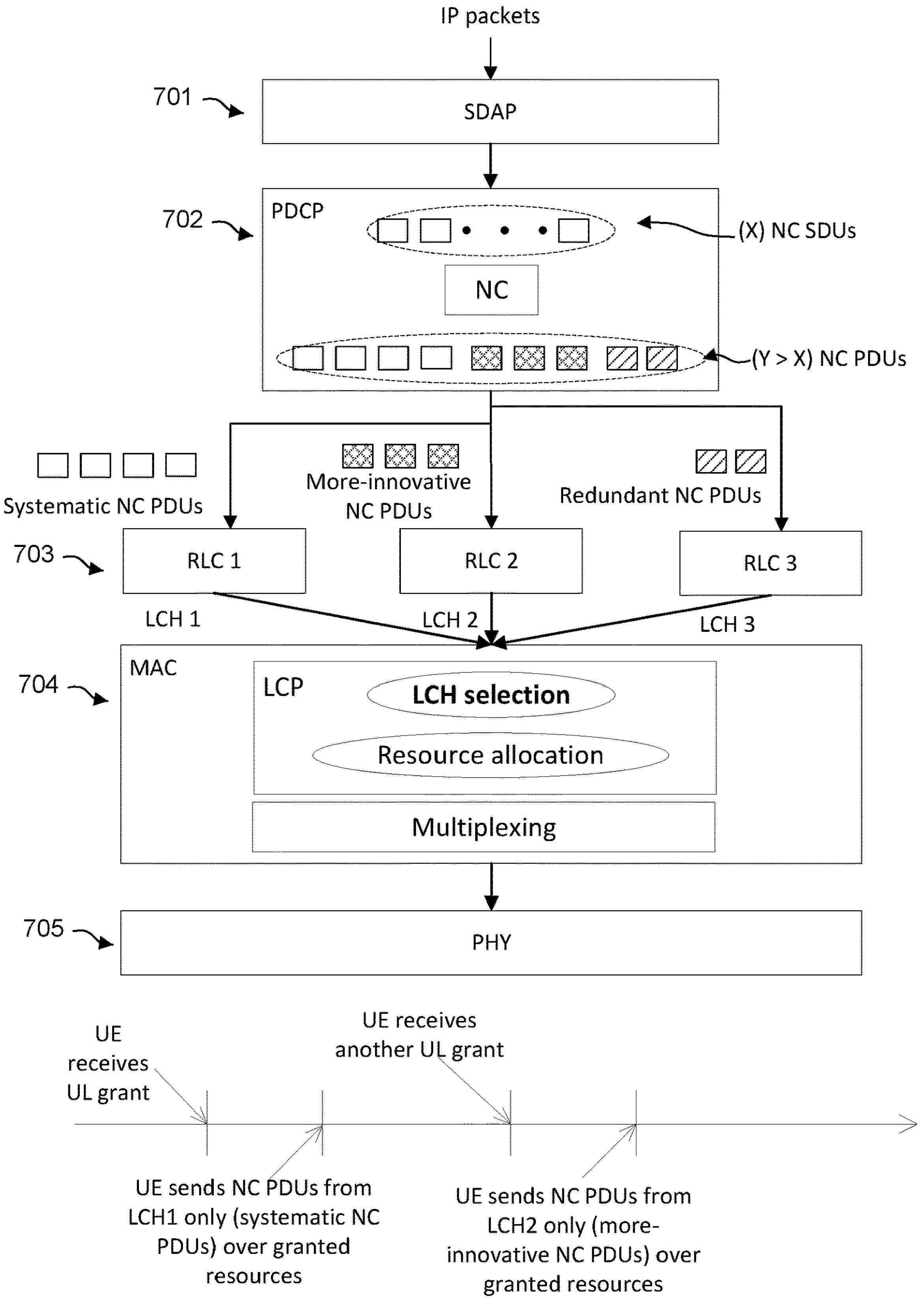
FIG. 7 shows features of a method according to an embodiment.

FIG. 7 shows features of a method according to an embodiment.

IP packets enter SDAP layer 701, which provides a mapping between QoS flows belonging to a PDU session (at the top of the SDAP layer) and Data Radio Bearers (at the bottom of the SDAP layer).

PDCP layer 702 provides header compression, ciphering and integrity protection for user plane data. An NC entity generates, from X NC SDUs, Y (Y>X) NC PDUs, i.e., generating NC PDUs/PDU sets with different characteristics, which are then mapped to RLC entities of an RLC layer as a function of one or more of their characteristics; systematic NC PDUs, more-innovative SDUs, and redundant SDUs, each of which enter a specific entity of the RLC layer 703 (e.g., systematic NC PDUs enter RLC entity 1, more-innovative NC PDUs enter RLC entity 2, and redundant NC PDUs enter RLC entity 3).

RLC 703 layer maps the different NC PDUs/PDU sets to different LCHs (e.g., systematic NC PDUs to LCH 1, more-innovative NC PDUs to LCH 2, and redundant NC PDUs to LCH3), which then enter the MAC layer 704.

MAC layer 704 is responsible for prioritizing and multiplexing logical channel data received from the RLC layer. The LCP in the MAC layer comprises LCH selection and resource allocation, whereafter the output data of the LCP is multiplexed and enters the physical layer 705 for transmission.

Figure 8:
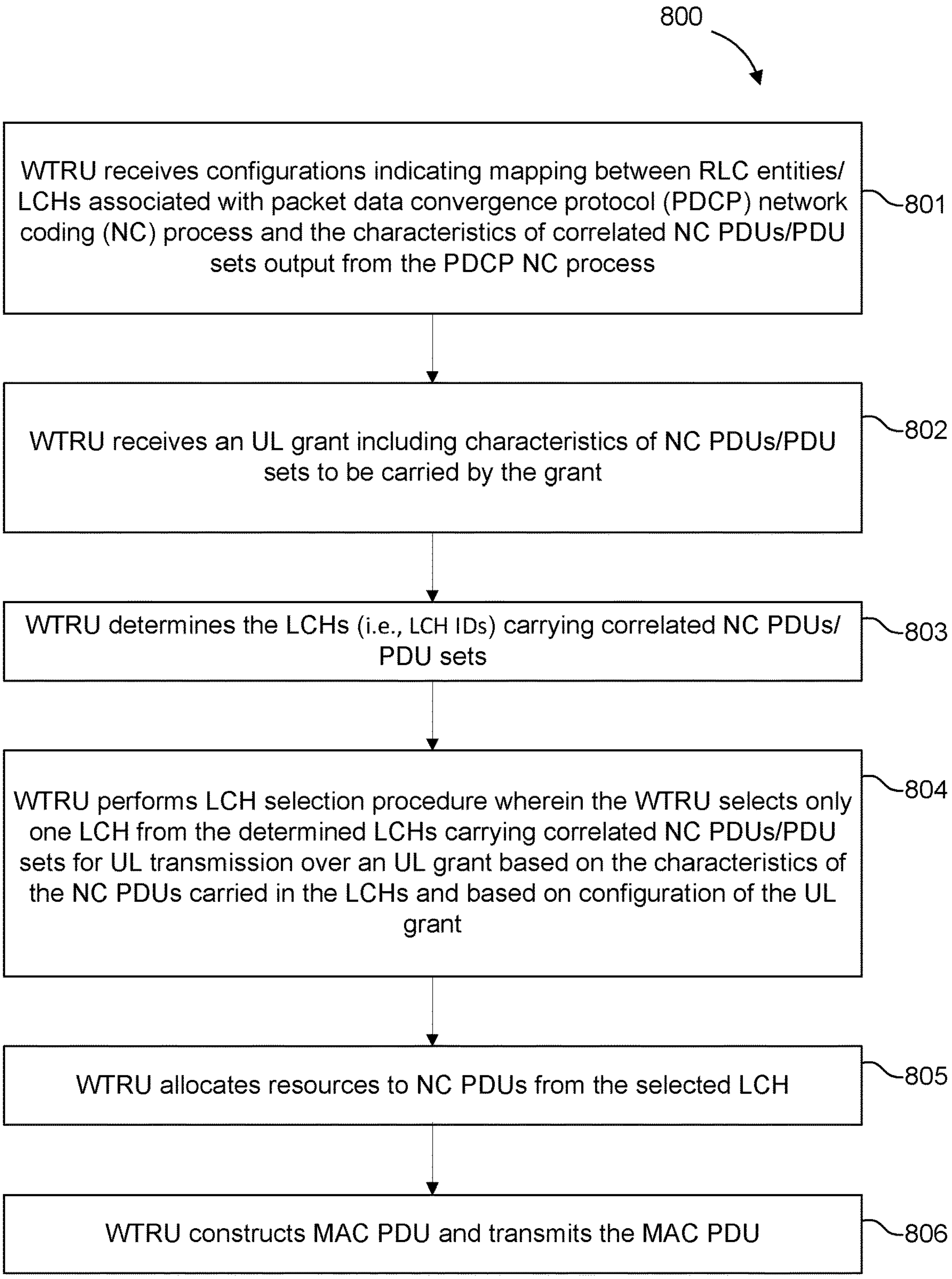
FIG. 8 is a flow chart of a method 800 according to an embodiment.

FIG. 8 is a flow chart of a method 800 according to an embodiment.

In 801, a WTRU receives configurations indicating mapping between RLC entities/LCHs associated with packet data convergence protocol (PDCP) network coding (NC) process and the characteristics of correlated NC PDUs/PDU sets output from the PDCP NC process.

In 802, the WTRU receives an UL grant including characteristics of NC PDUs/PDU sets to be carried by the grant.

In 803, the WTRU determines the LCHs (i.e., LCH IDs) carrying correlated NC PDUs/PDU sets.

In 804, the WTRU performs LCH selection procedure wherein the WTRU selects only one LCH from the determined LCHs carrying correlated NC PDUs/PDU sets for UL transmission over an UL grant based on the characteristics of the NC PDUs carried in the LCHs and based on configuration of the UL grant.

In 805, the WTRU allocates resources to NC PDUs from the selected LCH, and

In 806, the WTRU constructs MAC PDU and transmits the MAC PDU.

FIG. 9 is a flow chart of a method 900 according to an embodiment, the method being implemented by a WTRU in a network. The method comprising:

In 901, receiving configuration information related to multiple logical channels (LCHs) associated with a packet data convergence protocol (PDCP) network coding (NC) process, the multiple LCHs carrying correlated NC packet data units (PDUs) with different characteristics;

In 902, selecting an LCH from the LCHs carrying correlated NC PDUs for uplink (UL) transmission over an UL grant based on the characteristics of the NC PDUs carried in the LCHs and based on configuration of the UL grant; and In 903, allocating UL resources to NC PDUs from the selected LCH and transmitting the NC PDUs from the selected LCH using the allocated UL resources.

According to an embodiment of the method, the correlated NC PDUs are NC PDUs generated from linear combination of one or more NC service data units (SDUs) or NC SDU-segments that belong to a same NC generation.

According to an embodiment of the method, the characteristics are one or more of:

a type of the NC PDUs carried in the LCHs;

a priority level of the NC PDUs carried in the LCHs; and a remaining delay budget of the NC PDUs carried in the LCHs;

According to an embodiment of the method, the configuration of the UL grant comprises one or more of:

at least one type of NC PDUs allowed to be carried by the UL grant;

at least one priority level of NC PDUs allowed to be carried by the UL grant; and a minimum priority level of NC PDUs allowed to be carried by the UL grant.

According to an embodiment of the method, the at least one type of NC PDUs allowed to be carried by the UL grant is one or more of: redundant NC PDUs; systematic NC PDUs; non-systematic NC PDUs; coded NC PDUs; more-innovative NC PDUs; less-innovative NC PDUs;

high-priority NC PDUs (e.g. high-importance NC PDUs); low-priority NC PDUs (e.g. low-importance NC PDUs); error correction NC PDUs; and erasure correction NC PDUs.

According to an embodiment of the method, prioritized bit rate (PBR) based UL resources allocated to the selected LCH are adjusted (e.g., the resources are increased, or decreased), based on at least one of: decoding requirements of the NC PDUs carried in the selected LCH; the characteristics of the NC PDUs carried in the selected LCH.

According to an embodiment of the method, when the selected LCH carries only redundant NC PDUs, the allocating UL resources to the NC PDUs from the selected LCH is: deprioritized; or skipped.

According to an embodiment of the method, an order of serving (i.e., allocating UL resources) to LCHs with equal priorities is determined based on decoding requirements and characteristics of NC PDUs carried by these LCHs.

According to an embodiment of the method, LCP-related configuration parameters of a selected LCH are adjusted (e.g., dynamically) based on at least one of: decoding requirements; and characteristics of NC PDUs carried by the selected LCH.

There is also described a wireless transmit-receive unit (WTRU) in a network. The WTRU comprising at least one processor. The at least one processor is configured to:

receive configuration information related to multiple logical channels (LCHs) associated with a packet data convergence protocol (PDCP) network coding (NC) process, the multiple LCHs carrying correlated NC packet data units (PDUs) with different characteristics;

select an LCH from the LCHs carrying correlated NC PDUs for uplink (UL) transmission over an UL grant based on the characteristics of the NC PDUs carried in the LCHs and based on configuration of the UL grant; and allocate UL resources to NC PDUs from the selected LCH and transmitting the NC PDUs from the selected LCH using the allocated UL resources.

According to an embodiment, the correlated NC PDUs are NC PDUs generated from linear combination of one or more NC service data units (SDUs) or NC SDU-segments that belong to a same NC generation.

According to an embodiment, the characteristics are one or more of:

a type of the NC PDUs carried in the LCHs; and a priority level of the NC PDUs carried in the LCHs;

a remaining delay budget of the NC PDUs carried in the LCHs;

According to an embodiment, the configuration of the UL grant comprises one or more of:

at least one type of NC PDUs allowed to be carried by the UL grant;

at least one priority level of NC PDUs allowed to be carried by the UL grant; and a minimum priority level of NC PDUs allowed to be carried by the UL grant.

According to an embodiment, the at least one type of NC PDUs allowed to be carried by the UL grant is one or more of:

redundant NC PDUs; systematic NC PDUs; non-systematic NC PDUs; coded NC PDUs; more-innovative NC PDUs; less-innovative NC PDUs; high-priority NC PDUs (e.g., high-importance NC PDUs); low-priority NC PDUs (e.g., low-importance NC PDUs); error correction NC PDUs; and erasure correction NC PDUs.

According to an embodiment, prioritized bit rate (PBR) based UL resources allocated to the selected LCH are adjusted (e.g., increased or decreased), based on at least one of: decoding requirements of the NC PDUs carried in the selected LCH; and the characteristics of the NC PDUs carried in the selected LCH.

According to an embodiment, when the selected LCH carries only redundant NC PDUs, the allocating UL resources to the NC PDUs from the selected LCH is: deprioritized; or skipped.

According to an embodiment, an order of serving (i.e., allocating UL resources) to LCHs with equal priorities is determined based on decoding requirements and characteristics of NC PDUs carried by these LCHs.

According to an embodiment, LCP-related configuration parameters of a selected LCH are adjusted (e.g., dynamically) based on at least one of: decoding requirements; and characteristics of NC PDUs carried by the selected LCH.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of wireless communication capable devices, (e.g., radio wave emitters and receivers). However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term “video” or the term “imagery” may mean any of a snapshot, single image and/or multiple images displayed over a time basis. As another example, when referred to herein, the terms “user equipment” and its abbreviation “UE”, the term “remote” and/or the terms “head mounted display” or its abbreviation “HMD” may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

What is claimed is:

1. A method, implemented by a wireless transmit-receive unit (WTRU) in a network, the method comprising:

receiving configuration information related to multiple logical channels (LCHs) associated with a packet data convergence protocol (PDCP) network coding (NC) process, the multiple LCHs carrying correlated NC packet data units (PDUs) with different characteristics;

selecting an LCH from the LCHs carrying correlated NC PDUs for uplink (UL) transmission over an UL grant based on the characteristics of the NC PDUs carried in the LCHs and based on configuration of the UL grant; and allocating UL resources to NC PDUs from the selected LCH and transmitting the NC PDUs from the selected LCH using the allocated UL resources.

2. The method according to claim 1, wherein the correlated NC PDUs are NC PDUs generated from linear combination of one or more NC service data units (SDUs) or NC SDU-segments that belong to a same NC generation.

3. The method according to claim 1, wherein the characteristics are one or more of:

a type of the NC PDUs carried in the LCHs;

a priority level of the NC PDUs carried in the LCHs; and a remaining delay budget of the NC PDUs carried in the LCHs.

4. The method according to claim 1, wherein the configuration of the UL grant comprises one or more of:

at least one type of NC PDUs allowed to be carried by the UL grant;

at least one priority level of NC PDUs allowed to be carried by the UL grant; and a minimum priority level of NC PDUs allowed to be carried by the UL grant.

5. The method according to claim 4, wherein the at least one type of NC PDUs allowed to be carried by the UL grant is one or more of:

redundant NC PDUs; systematic NC PDUs; non-systematic NC PDUs; coded NC PDUs; more-innovative NC PDUs; less-innovative NC PDUs; high-priority NC PDUs; low-priority NC PDUs; error correction NC PDUs; and erasure correction NC PDUs.

6. The method according to claim 1, wherein prioritized bit rate (PBR) based UL resources allocated to the selected LCH are adjusted, based on at least one of: decoding requirements of the NC PDUs carried in the selected LCH; the characteristics of the NC PDUs carried in the selected LCH.

7. The method according to claim 1, wherein, when the selected LCH carries only redundant NC PDUs, the allocating UL resources to the NC PDUs from the selected LCH is:

deprioritized; or skipped.

8. A wireless transmit-receive unit (WTRU) in a network, the WTRU comprising at least one processor, wherein the at least one processor is configured to:

receive configuration information related to multiple logical channels (LCHs) associated with a packet data convergence protocol (PDCP) network coding (NC) process, the multiple LCHs carrying correlated NC packet data units (PDUs) with different characteristics;

select an LCH from the LCHs carrying correlated NC PDUs for uplink (UL) transmission over an UL grant based on the characteristics of the NC PDUs carried in the LCHs and based on configuration of the UL grant; and allocate UL resources to NC PDUs from the selected LCH and transmitting the NC PDUs from the selected LCH using the allocated UL resources.

9. The WTRU according to claim 8, wherein the correlated NC PDUs are NC PDUs generated from linear combination of one or more NC service data units (SDUs) or NC SDU-segments that belong to a same NC generation.

10. The WTRU according to claim 8, wherein the characteristics are one or more of:

a type of the NC PDUs carried in the LCHs;

a priority level of the NC PDUs carried in the LCHs; and a remaining delay budget of the NC PDUs carried in the LCHs.

11. The WTRU according to claim 8, wherein the configuration of the UL grant comprises one or more of:

at least one type of NC PDUs allowed to be carried by the UL grant;

at least one priority level of NC PDUs allowed to be carried by the UL grant; and a minimum priority level of NC PDUs allowed to be carried by the UL grant.

12. The WTRU according to claim 11, wherein the at least one type of NC PDUs allowed to be carried by the UL grant is one or more of:

redundant NC PDUs; systematic NC PDUs; non-systematic NC PDUs; coded NC PDUs; more-innovative NC PDUs; less-innovative NC PDUs; high-priority NC PDUs; low-priority NC PDUs; error correction NC PDUs; and erasure correction NC PDUs.

13. The WTRU according to claim 8, wherein prioritized bit rate (PBR) based UL resources allocated to the selected LCH are adjusted, based on at least one of: decoding requirements of the NC PDUs carried in the selected LCH; the characteristics of the NC PDUs carried in the selected LCH.

14. The WTRU according to claim 8, wherein, when the selected LCH carries only redundant NC PDUs, the allocating UL resources to the NC PDUs from the selected LCH is:

deprioritized; or skipped.

* * * * *